(12) United States Patent
Schmidt

(10) Patent No.: US 12,510,740 B2
(45) Date of Patent: Dec. 30, 2025

(54) METHOD AND APPARATUS FOR HIGH-RESOLUTION LOCALIZATION OF A SINGLE EMITTER IN MULTIPLE SPATIAL DIRECTIONS

(71) Applicant: ABBERIOR INSTRUMENTS GMBH, Gottingen (DE)

(72) Inventor: Roman Schmidt, Gottingen (DE)

(73) Assignee: ABBERIOR INSTRUMENTS GMBH, Gottingen (DE)

(*) Notice: Subject to any disclaimer, the term of this patent is extended or adjusted under 35 U.S.C. 154(b) by 369 days.

(21) Appl. No.: 18/220,871

(22) Filed: Jul. 12, 2023

(65) Prior Publication Data
US 2023/0350179 A1    Nov. 2, 2023

Related U.S. Application Data

(63) Continuation-in-part of application No. PCT/EP2022/050626, filed on Jan. 13, 2022.

(30) Foreign Application Priority Data

Jan. 13, 2021 (DE) ..................... 10 2021 100 564.7

(51) Int. Cl.
*G02B 21/00* (2006.01)
*G01N 21/64* (2006.01)

(52) U.S. Cl.
CPC ..... *G02B 21/0076* (2013.01); *G01N 21/6458* (2013.01); *G02B 21/0072* (2013.01); *G02B 21/008* (2013.01); *G02B 2207/113* (2013.01)

(58) Field of Classification Search
CPC ............ G02B 21/0076; G02B 21/0072; G02B 21/008; G02B 21/00; G02B 27/58; G01N 21/6458
See application file for complete search history.

(56) References Cited

U.S. PATENT DOCUMENTS

| | | |
|---|---|---|
| 11,255,791 B2 | 2/2022 | Hell et al. |
| 2012/0104279 A1 | 5/2012 | Reuss et al. |

(Continued)

FOREIGN PATENT DOCUMENTS

| | | |
|---|---|---|
| DE | 10 2013 114 860 B3 | 5/2015 |
| DE | 20 2015 001 565 U1 | 11/2015 |

(Continued)

OTHER PUBLICATIONS

International Search Report for PCT/EP2022/050626 dated May 9, 2022.

(Continued)

*Primary Examiner* — Mustak Choudhury
(74) *Attorney, Agent, or Firm* — MOSER TABOADA

(57) ABSTRACT

The present disclosure relates to MINFLUX nanoscopy. The present disclosure improves three-dimensional localization of isolated emitters, particularly of isolated fluorescent emitters. The utilization of the emitted photons of isolated excitable emitters, in particular of isolated excitable fluorescent emitters, for a three-dimensional localization is improved by separating the localization according to the MINFLUX principle using a 3D excitation donut into a sequence of separate steps, wherein in one step either an axial location or a lateral location of the fluorophore is determined. Thereby, the more precise knowledge of the axial position increases the quality of a following lateral localization and vice versa. The three-dimensional localization is further improved by a method for axial localization by scanning an axial scanning area with a 3D excitation donut and a preferably following evaluation of the measured intensities or photon numbers by forming a vector sum.

29 Claims, 10 Drawing Sheets

(56) References Cited

U.S. PATENT DOCUMENTS

| | | | |
|---|---|---|---|
| 2013/0294645 A1* | 11/2013 | Sibarita | G06T 7/73 |
| | | | 382/103 |
| 2014/0042340 A1 | 2/2014 | Hell | |
| 2016/0086027 A1* | 3/2016 | Sibarita | G06T 7/168 |
| | | | 382/207 |
| 2016/0305884 A1 | 10/2016 | Hell | |
| 2018/0024063 A1 | 1/2018 | Egner et al. | |
| 2019/0234879 A1* | 8/2019 | Balzarotti | G01N 21/6428 |
| 2019/0234882 A1* | 8/2019 | Balzarotti | G01N 21/6458 |
| 2019/0235220 A1* | 8/2019 | Balzarotti | G01N 21/6428 |
| 2020/0393378 A1* | 12/2020 | Hell | G01N 21/6456 |
| 2021/0165199 A1* | 6/2021 | Heine | G02B 27/58 |
| 2022/0057615 A1 | 2/2022 | Harke et al. | |

FOREIGN PATENT DOCUMENTS

| | | |
|---|---|---|
| DE | 10 2016 104 651 A1 | 9/2016 |
| DE | 10 2015 105 018 A1 | 10/2016 |
| DE | 10 2011 055 367 B4 | 2/2017 |
| EP | 3 055 674 B1 | 8/2017 |
| WO | WO 2015/109323 A2 | 7/2015 |
| WO | WO 2018/069283 A1 | 4/2018 |
| WO | WO 2020/128106 A1 | 6/2020 |

OTHER PUBLICATIONS

Balzarotti, Francisco et al., "Nanometer resolution imaging and tracking of fluorescent molecules with minimal photon fluxes", 85 pages, arXiv:1611.03401v1 [physics.optics], https://doi.org/10.48550/arXiv.1611.03401.

Pape, J. K. et al., "Multicolor 3D MINFLUX nanoscopy of mitochondrial MICOS proteins", Proceedings of the National Academy of Sciences of the USA, Aug. 25, 2020 vol. 117 No. 34, p. 20607-20614. doi:10.1073/pnas.2009364117.

Westphal, V. et al., "Nanoscale resolution in the focal plane of an optical microscope". Phys Rev Lett. Apr. 15, 2005, 4 pages, 94(14):143903. doi: 10.1103/PhysRevLett.94.143903. Epub Apr. 15, 2005. PMID: 15904066.

Chiu, Chi-Li et al., "Axial super resolution topography of focal adhesion by confocal microscopy : Axial Super Resolution Topography", Microscopy Research and Technique., Band 76, Nr. 10, Jul. 29, 2013 (Jul. 29, 2013), 10 pages, Seite 1070-1078, XP055915860 DOI: 10.1002/jemt.22267 external link Issn: 1059-910X.

Pape, Jasmin Kathrin, "Multicolor 3D Minflux Nanoscopy for Biological Imaging", Dissertation,2020, 142 pages, http://dx.doi.org/10.53846/goediss-8248.

Gwosch, Klaus C et al, "MINFLUX nanoscopy delivers 3D multicolor nanometer resolution in cells", Nature Methods, Feb. 2020, p. 217-224, vol. 17, XP037006746 DOI: 10.1038/S41592-019-0688-0 external link ISSN:1548-7091.

* cited by examiner

METHOD AND APPARATUS FOR HIGH-RESOLUTION LOCALIZATION OF A SINGLE EMITTER IN MULTIPLE SPATIAL DIRECTIONS

CROSS-REFERENCE TO RELATED APPLICATIONS

The present application is a continuation-in-part application and claims priority to and the benefit of International Patent Application No. PCT/EP2022/050626, filed on Jan. 13, 2022, which claims priority of the German patent application 10 2021 100 564.7, filed on Jan. 13, 2021, the entire contents of both applications is incorporated herein by reference.

TECHNICAL FIELD OF THE PRESENT DISCLOSURE

The present disclosure relates to MINFLUX nanoscopy. The present disclosure improves the three-dimensional localization of isolated emitters, in particular of isolated fluorophores.

PRIOR ART

MINFLUX nanoscopy is a microscopy method that is still young. MINFLUX nanoscopy is a localization microscopy method. Fluorophores are localized by means of structured excitation light distributions. A fundamental feature of MINFLUX nanoscopy is that the fluorophores are excited in such a way that a fluorophore to be localized is always placed close to or in a minimum of the excitation light distribution, which is ideally a zero point, whereby the excitation light distribution adjacent to the minimum has an intensity increase range. This achieves a particularly good utilization of the fluorescence photons with respect to obtaining information about the position of the respective emitting fluorophore. This also applies to applications in which the movement of fluorophores is to be tracked over time. The observation of a sample using an excitation minimum, a basis of MINFLUX nanoscopy, is known, for example, from the patents DE 10 2011 055 367 B4, here initially only for tracking the movement of individual molecules in a sample, EP 3 055 674 B1 and DE 10 2013 114 860 B3. In patent EP 3 055 674 B1, it is proposed to use different excitation light distributions for tracking a particle in a sample in several spatial directions in alternation, with which the particle is tracked in mutually orthogonal directions in each case.

Based on this, a number of refinements for information retrieval have been developed, which allow localization of fluorophores with an uncertainty in the range below 2 nm. This size of uncertainty corresponds to the extent of fluorophores. A detailed account of MINFLUX nanoscopy can be found in "Nanometer resolution imaging and tracking of fluorescent molecules with minimal photon fluxes," Francisco Balzarotti et. al, arXiv:1611.03401 [physics.optics] (2016). Experimentally, non-iterative MINFLUX localization is demonstrated, as well as tracking of isolated fluorophores using MINFLUX. In addition, the concept of iterative MINFLUX is presented. Basically, in order to localize a fluorophore using MINFLUX nanoscopy, the intensity minimum or zero must be placed at a plurality of positions relative to the location of the fluorophore. For this, to in a preparatory step, a position of the fluorophore must be estimated or must be known with a first, lower accuracy. This can be done, for example, by means of ordinary localization microscopy (PALM, STORM) or by means of other known methods. For this purpose, the publication mentioned describes a method in which a sample is scanned with a Gaussian intensity distribution until fluorescence is detected at a scanning position, which with some probability originates from an isolated molecule. The scanning is then stopped, and the intensity distribution is then positioned at four locations around the scan position at a distance less than the wavelength of light from it. From the photon counts measured for each of two individual positions opposite to each other with respect to the scanning position, the position of the isolated emitter is estimated with respect to the direction of the connecting line in each case according to a method described in the publication, so that overall the emitter position in both spatial directions perpendicular to the optical axis is determined. Although this procedure for pre-localization is described in connection with the following tracking of the motion of a fluorophore, it can equally be used in connection with a localization. The estimation per direction corresponds in essence to a ratiometric evaluation of photon numbers. Subsequently, an intensity distribution of excitation light with a central minimum, for example in the shape of a donut as known from STED microscopy, is placed at a known position chosen such that the estimated location of the fluorophore is close to the minimum of the intensity distribution. The fluorescence response of the fluorophore is measured. The same is repeated for one or more other positions of the intensity distribution. By means of a ratiometric evaluation of the intensity ratios, the position of the fluorophore is determined with higher accuracy. Basically, the emission rate increases the further the fluorophore is from the excitation minimum or the further the fluorophore is shifted into an intensity increase region. This more accurately determined position can now be used as a starting position for repeating the sequence of steps above, where the positions of the minimum of the intensity distribution of excitation light can be placed closer to the estimated location of the fluorophore. The closer the minimum positions of the intensity distribution are to the actual location of the fluorophore in each case, the fewer fluorescence photons are required for localization with a given uncertainty or accuracy. The publication points out that localization can be performed in two dimensions by first performing localization in one direction with a one-dimensional profile and then performing localization in another direction with the same profile but after a rotation. It is further noted that future work would be directed towards localization in three dimensions using z-donuts.

The patent disclosure documents relating to MINFLUX microscopy are, in particular, WO 2018/069 283 A1, US 2019/0235220 A1, US 2019/0234882 A1 and US 2019/0234879 A1, whereby the aforementioned US patent applications are all subsequent applications to the first-mentioned international patent application, in which all the concepts mentioned subsequently with reference to the US disclosure documents are also disclosed.

US 2019/0235220 A1 is directed to a method having a small or minimal number of positions at which an intensity minimum of an excitation intensity profile, which is adjacent to both sides of intensity increase regions in each spatial direction in which a location of the fluorophore is to be determined, is placed to determine the location of the fluorophore.

US 2019/0234882 A1 is directed to the method described further above, in which the location information obtained from a first MINFLUX step is used to place the minimum of the intensity light distribution closer to the fluorophore in each case in a subsequent step and derive more precise location information therefrom.

US 2019/0234879 A1 is directed to a method in which the intensity minimum of an excitation intensity profile is placed very quickly, quasi-simultaneously, at a plurality of positions around the estimated location of the fluorophore. A single position is then moved closer to the suspected minimum if an increased emission rate is detected at it.

According to WO 2018/069 283 A1, localization can be performed in multiple spatial directions by performing any of the disclosed methods sequentially for different orientations, for example using a one-dimensional excitation intensity profile first in a first direction and then in a direction different from the first direction.

In the publication "MINFLUX nanoscopy delivers 3D multicolor nanometer resolution in cells", Klaus C. Gwosch et. al, Nat Methods 17, 217-224 (2020). https://doi.org/10.1038/s41592-019-0688-0, (together with the related "Supplementary information") a concrete realization of a three-dimensional localization using MINFLUX is described. In a subregion of a sample, focused activation light is used to bring an isolated fluorophore into an excitable state. This fluorophore is localized in a first step by means of focused excitation light, where the intensity distribution in the focus essentially corresponds to a Gaussian distribution, by placing the focus of the excitation light at four positions around the position of the activation focus. A spatial coordinate of the fluorophore position in the direction of the straight line connecting the two positions is determined from the fluorescence signals measured for each of two opposite positions, so that a lateral position is determined overall. Subsequently, in a second step, the sample is exposed to focused to excitation light, where the focus has the form of a 3D donut, i.e., where the intensity distribution has a local minimum surrounded by intensity increase regions in all three spatial directions. In this case, the 3D donut is placed successively at a total of two positions, with the local intensity minimum in the lateral direction being located in each case at the position determined in the first step. In the axial direction, the local minimum is placed along the optical axis once above and once below the expected fluorophore position, or as originally stated:: "the 3D donut is targeted in two positions above and below the anticipated fluorophore position." This pre-localization is followed by a more precise localization using a sampling pattern with seven positions, five of which are in a sampling pattern plane, where one of these five is in the center of the sampling pattern plane, and four of these five are evenly distributed on a circle around the central position. The sampling pattern has two other positions that lie on a sampling pattern axis together with the central position of the sampling pattern plane, so that a total of three positions lie on the sampling pattern axis. The 3D donut is now placed sequentially at the seven positions of the scan pattern, with the central position of the scan pattern placed at the position of the fluorophore determined during pre-localization. This localization is followed by another localization in which a reduced but otherwise identical scan pattern is used. This can be continued iteratively until the fluorophore loses its fluorescence capability.

In the publication "Multicolor 3D MINFLUX nanoscopy of mitochondrial MICOS proteins," Jasmin K. Pape et al, PNAS Aug. 25, 2020 117 (34) 20607-20614, 2020 http://doi.org/10.1073/pnas.2009364117, another application of the method presented in the publication "MINFLUX nanoscopy delivers 3D multicolor nanometer resolution in cells" is described.

While in image-based localization methods such as PALM or STORM, in which diffraction images of isolated fluorophores are recorded from which the position of the fluorophore is then determined, the resolution is essentially proportional on the one hand to the wavelength of the light used and on the other hand inversely proportional to the square root of the number of photons detected, the resolution in an iterative MINFLUX method depends on the exact type of iteration. This is true for a localization in two dimensions as well as for a localization in three dimensions. This is precisely because the uncertainty with which the position of a fluorophore in a given iteration step, that is, for a given extent of the sampling pattern, depends on the extent of the sampling pattern. It should be noted that localization is only successful if the distance of the actual position of the fluorophore to the central position is not too large in relation to the extent of the sampling pattern.

In the above-mentioned publication "Nanometer resolution imaging and tracking of fluorescent molecules with minimal photon fluxes" it is stated that the smallest uncertainty of the two-dimensional location determination that can be achieved when using a sampling pattern with a total of four sampling pattern positions, three of which lie on a circle and one in the center of the circle, when sampling with a 2D excitation donut, is proportional to the diameter L of the sampling pattern and, moreover, is inversely proportional to the square root of the number of detected photons. This leads to the fact that the goal must be to achieve iteratively small diameters of the sampling pattern, taking care that in each case the diameter of the sampling pattern in a subsequent step must be sufficiently large to ensure that the distance of the actual position of the fluorophore to the position determined in the preceding iteration step is not too large in relation to the extent of this sampling pattern, otherwise the localization in this subsequent step will not succeed. An ideal utilization of the information succeeds under application of a maximum likelihood estimation. However, this requires that the intensity profiles of the excitation donut and, for example, the amount of background fluorescence are well known. In addition, localizations using maximum-likelihood methods are time-consuming and therefore not suitable for iterative application, since the reduction of the sampling pattern and the shifting of the pattern to the location estimated in one step must be done as fast as possible. In practical application, therefore, according to prior art, a so-called modified least mean squared estimator (mLMSE) of the form $$\hat{r}_{mLMS}^{(k)}(\hat{p}, \vec{\beta}) = -\frac{1}{1 - \frac{L^2 \ln(2)}{fwhm^2}} \left( \sum_{j=0}^{k} \beta_j \hat{p}_0^j \right) \sum_{i=1}^{3} \hat{p}_i \cdot \vec{r}_{b_i},$$

is used (in equation S50 of the publication and all equations based on this equation it is erroneously called "log (2)" without specifying a base instead of "ln (2)"), where the $\hat{p}_i$ in each case are photon numbers normalized to the total number of detected photons at the position $\vec{r}_{b_i}$. With fwhm the full half-width of the range around the local minimum of the excitation donut is denoted, k is an order of the estimator whose choice influences the range in which localization is possible, and $\beta_j$ is a scalar parameter to be chosen, in particular, depending on the expected signal-to-noise ratio, in order to obtain localizations that have the lowest possible systematic shift.

This estimator, used in practice, was based on a so-called linearized least mean squared (LMS) estimator, $$\hat{r}_{LMS}(\hat{p}) = -\frac{1}{1 - \frac{L^2 \ln(2)}{fwhm^2}} \sum_{i=1}^{3} \hat{p}_i \cdot \vec{r}_{b_i}$$

which in turn is derived by linearizing the solution of a maximum likelihood determination. According to information in "MINFLUX nanoscopy delivers 3D multicolor nanometer resolution in cells," the LMS estimator has the disadvantage that the number of photons measured in the center of the sampling pattern is not included in the location determination. This disadvantage would be a crucial one, because while the value measured at the center would not contain direct information about the direction of a location of a fluorophore in a plane, it would contain information about the distance of the location of the fluorophore from the center. The goal of the development of the mLMSE was accordingly to make the information from the measurement in the center usable. This would be important because otherwise existing ambiguities of the localization are avoided by the measurement in the center. Such ambiguities exist if no measurement value obtained in the center is evaluated, in that in certain situations it cannot be decided on the basis of the measurement whether a fluorophore is located inside the circle of the outer positions of the sampling pattern or outside.

In principle, the mLMSE exhibits a bias, i.e., the positions of the fluorophore determined by means of the mLMSE are systematically shifted with respect to the actual positions, but this bias is minimized by choosing the parameters $\beta_j$ are chosen optimally. In principle, this estimator can only be applied as an estimator if the sampling pattern has a position in the center where sampling actually occurs. Because on the measurement of the photon number in the center of the sampling pattern is based the term $\Sigma_{j=0}^{k} \beta_j \hat{p}_0^j$, which provides a suitable scaling of the estimator to minimize the bias. While it is possible, and indeed common, to further analyze the data after the measurements have been completed in order to obtain improved estimates of the locations of all fluorophores localized in the manner described above compared to the estimates obtained during the measurements, the quality of the analysis to be obtained therefrom is nevertheless critically dependent on the quality of the estimates obtained during the measurements, since these form the basis for the iteration process and hence for the smallest possible diameter of the sampling pattern and for the number of photons measurable using this smallest sampling pattern.

The method described in "MINFLUX nanoscopy delivers 3D multicolor nanometer resolution in cells" and the accompanying "Supplementary Information" now builds directly on the method referenced above and the theoretical work on this method. For the estimation of the position of the fluorophore during the measurement with a 3D donut, the mLMSE is used in the generalized form $$\hat{r}_{mLMS}^{(k)}(\hat{p}, \bar{\beta}) = -\frac{1}{1 - \frac{L^2 \ln(2)}{fwhm^2}} \left( \sum_{j=0}^{k} \beta_j \hat{p}_0^j \right) \sum_{i=0}^{m-1} \hat{p}_i \cdot \vec{r}_{b_i},$$

(where in the right summand the value at index i=0 does not contribute). For the concretely represented measurements the order k=1 was chosen, so that altogether for the measurement, as above referred (four positions on a circle and three on the axis), the estimator takes the form $$\hat{r}_{mLMS}^{(k)}(\hat{p}, \bar{\beta}) = -\frac{1}{1 - \frac{L^2 \ln(2)}{fwhm^2}} \left( \sum_{j=0}^{1} \beta_j \hat{p}_0^j \right).$$

Here, the parameters $\beta_j$, which are each scalar values, are numerically optimized for a typical signal-to-noise ratio, where the shape of the 3D donut is approximated by a quadratic function, that is, assuming a quadratic increase in intensity with distance from the central intensity minimum of the 3D excitation donut. Optimal parameters for an iterative MINFLUX localization, i.e., the number of iteration steps, the diameters of the scan patterns L for each of the scan steps, and the photon numbers N for each of the scan steps are determined from a simulation, starting from the assumption that a fluorophore is located within the activation volume with a diameter of 360 nm, which also includes the final localization using a maximum-likelihood estimation. Within this simulation, the variation of both a Gaussian excitation spot and a 2D donut in the axial direction was also considered, although it is unclear whether the properties of 3D localization were investigated using a 2D donut.

Using MINFLUX nanoscopy, the position of fluorophores in three spatial directions could be determined experimentally with an uncertainty of few nanometers, i.e. the accuracy of the position determination is comparable to the extension of the fluorophores themselves. If the position of a single fluorophore is to be determined with a given measurement uncertainty, a shorter time and, in particular, a smaller number of fluorescence photons are required for this purpose than for a position determination of a single fluorophore using conventional localization microscopy. A localization of single fluorophores in three spatial directions according to a MINFLUX method is concretely shown in the prior art only for a direct coupling of the localization to an activation of the fluorophore to be localized. Here, due to the local activation, the axial position of the fluorophore to be localized is in many cases sufficiently well known to estimate the axial position more precisely by applying a z-donut of excitation light, which is placed once above this axial position and once below. If the axial position of the isolated fluorophore is not known with sufficient accuracy from activation, the method described in the prior art will fail. It is fundamentally not applicable when isolated fluorophores are to be localized without explicitly activating them immediately prior to localization. Furthermore, the prior art method has the weakness that the quality of the estimates of the position obtained in time during the measurements is not only reduced by the background signal as such, but is systematically further reduced if the background signal deviates from the assumptions about the background signal used in the optimization of the parameters $\beta_j$.

Another crucial weakness of the known method for 3D MINFLUX nanoscopy results from the fact that the real-time estimation of the position of a fluorophore is based on the approximation of the shape of a 3D excitation donut by a quadratic function and on a coupled estimation of both the axial and lateral position. Since this approximation is a good approximation at best for very small distances from the central minimum, this assumption combined with the use of the known estimator leads to a diminished utilization of the information available in the fluorescence, especially in early steps of a MINFLUX iteration, when using large diameter sampling patterns.

Objective of the Present Disclosure

The disclosure is based on the task of providing improved MINFLUX methods for the localization of isolated emitters in three-dimensionally extended samples or sample areas. In particular the isolated emitters to be localized are isolated fluorophores. On the one hand, it should be possible to reliably localize even those emitters whose axial position is not well known from the outset. On the other hand, the utilization of emission, in particular of fluorescence emission in determining the localization of isolated emitters in three-dimensionally extended samples or sample areas should be further improved.

Solution

The object of the present disclosure is solved by a localization microscopic method with the features of independent patent claim 1, as well as by a microscope with the features of claim 28, which is set up to carry out a method according to the present disclosure. Dependent claims 2 to 27 concern preferred embodiments of the method according to claim 1, dependent claim 29 concerns a preferred embodiment of the microscope according to claim 28.

Description of the Present Disclosure

According to a first aspect of the present disclosure, in order to further improve the utilization of emission in determining the localization of isolated emitters in three-dimensionally extended samples or sample regions, in particular in order to further improve the utilization of fluorescence emission in determining the localization of isolated fluorescent emitters or fluorophores in three-dimensionally extended samples or sample regions, when localizing an isolated excitable emitter, in particular an excitable isolated fluorescent emitter or fluorophor, in a sample according to a MINFLUX method using a 3D excitation donut, that is, an intensity distribution of excitation light having a local minimum surrounded by intensity increase regions in all three spatial directions, the localization is divided into two steps, an axial localization step and a lateral localization step. In the prior art, it is admittedly known to use a 3D excitation donut for an axial localization in one step without redetermining a lateral location in this step. However, this axial localization, for which the central local minimum of the 3D donut is placed at two axial sample positions on a scan pattern axis passing through an estimated location of the excitable fluorophore, is then followed by a simultaneous localization in lateral and axial directions, for which the central local minimum of the 3D excitation donut is placed on a scan pattern extended in three spatial directions around an estimated location of the excitable fluorophore.

In general, in this application, emitters are understood to be objects which, when illuminated with excitation light, can be considered point light sources with respect to the measurements according to the present disclosure. The light emitted by the object, i.e. the emission emitted by the object acting as a point light source can, for example, be scattered light resulting from elastic scattering such as Rayleigh scattering or inelastic scattering such as Raman scattering, or it can be luminescent light, in particular fluorescent light, i.e. fluorescence emission. It is essential for an emitter that light is emitted from it immediately or with a small time delay in response to illumination. Here, if movements of the emitter are to be tracked, the maximum time delay is related to the temporal resolution with which the movements of the light-emitting particles or light-emitting units are to be tracked, and to the speed with which the particles or units move in the sample. Time delays can be as short as about 10 µs, but are usually in the range of up to tens of nanoseconds, often in the range of 1 to 10 ns, and, if the emission is scattered light, zero. Emitters can be, for example, metallic nanoparticles or fluorescent emitters. The more specific term fluorescent emitter includes, for example, individual fluorescent dye molecules or their fluorescent chemical groups. Instead of dyes, other fluorescent entities such as quantum dots or up-converting nanoparticles may also be used for labeling. Accordingly, in the context of the application, excitation light is understood to mean not only fluorescence excitation light, but generally such light that causes light to emanate from an emitter.

The method for high-resolution determination of the location of an excitable emitter in three spatial directions in a sample by sampling the excitable emitter with a 3D excitation donut having a central local minimum according to the first aspect of the present disclosure thus comprises an axial localization step known from the prior art,
    wherein the central local minimum is sequentially placed at two axial sample positions on a sampling pattern axis passing through an estimated location of the excitable emitter, the pair of sample positions enclosing the estimated location of the excitable emitter,
    wherein in the axial localization step emission emitted from the excitable emitter for each of the axial sample positions is measured and the measured value is assigned to the respective axial sample position,
    wherein in the axial localization step a new estimate of the axial location of the excitable emitter is determined from the measured values associated with the axial sample positions.

In particular, the excitable emitter can be an excitable fluorescent emitter or an excitable fluorophor and the emitted emission can be, accordingly, fluorescence emission.

In contrast to the prior art, however, this is not followed by simultaneous localization in the lateral and axial directions, but rather by a lateral localization step,
    wherein the central local minimum is placed exclusively in a sample pattern plane oriented perpendicular to the sampling pattern axis sequentially at at least three lateral sample positions disposed around a location of the excitable emitter estimated in one or more steps performed earlier,
    wherein in the lateral localization step emission emitted from the excitable emitter for each of the lateral sample positions is measured and the measured value is assigned to the respective lateral sample position,
    wherein in the lateral localization step a new estimate of the lateral location of the excitable emitter is determined from the measured values associated with the lateral sample positions.

At least three lateral sample positions are used, since this is the minimum number of sample positions from which a lateral localization can be made in two lateral spatial directions. Preferably, the sample positions are chosen to be evenly spaced on a circle around the estimated location of the excitable emitter. It is convenient to select six such sample positions, since this provides very symmetrical imaging conditions, with the consequence that the uncertainty of the estimate of the location of a fluorophore depends only slightly on the exact actual location of the fluorophore. In principle, in addition to the sample positions located around the estimated location of the fluorophore, another sample position corresponding to the estimated location of the fluorophore can be used.

Now, in order to be able to reliably localize also those fluorophores whose axial position is not well known a priori, according to a second aspect of the present disclosure, a method for axial localization is proposed which is suitable for determining the axial location of fluorophores whose axial location is only poorly known before carrying out the method according to this aspect of the present disclosure, for example with an uncertainty of ±250 nm or ±500 nm or with even greater uncertainty. The method mentioned at the beginning of the description of the present disclosure is not suitable for this purpose, since it can be used to locate only those fluorophores that are clearly within a range between the maxima of the axial intensity profile both when the central local minimum of the 3D donut is located at one and when it is located at the other of the two sample positions on the scan pattern axis. This region between the maxima is extended about 500 nm in the prior art arrangement.

According to the second aspect of the present disclosure, an axial localization of an excitable emitter is performed by scanning the excitable emitter with focused excitation light, wherein an axial scanning range is greater than 500 nm or is greater than 1000 nm. In particular, the axial scanning range extends parallel to or along an optical axis along which the sample is illuminated with the excitation light. The axial localization is in particular a localization parallel to or along this optical axis. The optical axis may be identical to or parallel to the sampling pattern axis defined in connection with the method according to the first aspect.

In principle, the method according to this second aspect of the present disclosure can be performed with a Gaussian excitation focus. Then the axial intensity profile of the excitation light has a central maximum. At a later point, it will be explained that for localization in certain cases, the axial intensity profile is not directly decisive, but an effective axial intensity profile, which results from the axial intensity profile taking into account a point spread function of the detection. This effective axial intensity profile then also has a central maximum.

Then, during scanning, it is favorable that adjacent sampling points have at most half the distance of a half-value width of the axial effective intensity profile. This ensures that the excitable emitter is either subjected at least once to an intensity that does not deviate greatly from the maximum intensity, once to a reduced intensity and additionally to a greatly reduced intensity during the course of the scan, or it is subjected twice to an intensity that is reduced but deviates only slightly from the maximum intensity, with a different position relative to the pattern of sampling positions.

If scanning is to be performed with a Gaussian excitation focus, this requires switching between two types of illumination if MINFLUX localization with the use of a 3D excitation donut is to be performed downstream of the axial localization procedure. Solutions for such measures exist in the prior art. Conversely, dispensing with switching requires that scanning be performed with the same axial intensity profile as that used for MINFLUX localization, i.e., one with a central minimum. The latter initially seems unsuitable for scanning because the excitation intensity is not concentrated in a narrow region; rather, it is precisely in the central region of the axial intensity profile that there is a minimum, so that particularly little excitation intensity is provided in the region around the center. However, investigations by the inventor have shown that despite these obvious disadvantages for scanning, axial localization is surprisingly successful even when scanning with the axial intensity profile of a 3D donut.

Accordingly, the method according to the second aspect of the present disclosure may particularly preferably be performed such that the focused excitation light is a 3D excitation donut having an effective axial intensity profile with a central local minimum and with maxima adjacent to the minimum. In this case, the scanning range as well as distances of the sample positions can also be specified with respect to the distance of the maxima of the effective axial intensity profile. Then an axial scanning range is larger than a distance of maxima of the effective axial intensity profile, preferably the scanning range is at least twice as large as the distance of maxima of the effective axial intensity profile.

A capture range is understood here as a range within which an unambiguous localization is possible when a respective sampling pattern is applied, i.e. when a respective set of sampling points is applied. In the method according to the second aspect of the present disclosure, when a 3D excitation donut is used for the axial localization, it is preferred that an axial capture range is at least as large as the distance between the maxima of the effective axial intensity profile.

The sampling pattern can preferably be selected when using a 3D excitation donut for axial localization such that adjacent sampling points are at most half the distance between the maxima of the axial effective intensity profile. However, the pattern of sampling positions may then have a gap at the center, the location of which usually coincides with the estimated location of the excitable emitter. This means that sampling points adjacent to the central position of the axial region may have a larger gap between them. This larger distance is then at most as large as the distance between the maxima of the axial effective intensity profile.

Further preferred embodiments will be given later, since their particular features also correspond to particular features of the method according to the first aspect of the present disclosure.

The method according to the first aspect of the present disclosure, which further improves the utilization of emission, particularly of fluorescence, in determining the localization of isolated emitters, particularly of fluorescent emitters, in three-dimensionally extended samples or sample regions, can now preferably be carried out such, that the steps for obtaining the estimated location of the excitable emitter comprise as one step a lateral pre-localization for estimating a lateral location of the excitable emitter, which is performed prior to the axial localization step and the lateral localization step, that is, is performed prior to performing the steps essential to the first aspect of the present disclosure. In the prior art, such lateral pre-localization is performed prior to performing a MINFLUX process not according to the present disclosure using a Gaussian excitation light. This requires a switching option for switching the excitation light from a Gaussian excitation light to a 3D donut, which is technically and thus economically comparatively costly. To reduce the technical effort and also to increase the measurement speed, the pre-localization is preferably performed by exciting the excitable emitter, which in particular can be a fluorescent emitter or a fluorophore, to emission, in particular to fluorescence with a 3D excitation donut, and the excited emission is detected with a detector.

In this method, the lateral location of the excitable emitter can preferably be estimated from a spatially resolved detection of the emission in an image plane containing a point confocal to the excitation focus. In this context, the spatially resolved detection of the emission in the image plane can be performed, for example, with an array of photon-counting avalanche diodes. From the distribution of the measured numbers of photons, or if a non-counting detector array or arrays of detectors are used, from the distribution of the measured values for the emission in the image plane, the location of the emitter in the sample can then be estimated, that is, it can be estimated where within the excitation focus the excitable emitter is located. This does not require any shift of the excitation focus, nor does it require any scanner adjustment.

Alternatively, the spatially resolved detection of the emission in the image plane can be performed by displacing the point confocal to the excitation focus in the image plane relative to a pinhole, preferably on a circular path around a center, whereby emission passing through the pinhole is detected by a detector, which need not have any spatial resolution, and assigned to the respective position of the confocal point. Again, from the distribution of the measured values for the emission in the image plane, the location of the emitter in the sample can be estimated, i.e., it can be estimated where within the excitation focus the excitable emitter is located. The excitation focus should be left stationary in this case. This can be achieved with simultaneous displacement of the point confocal to the excitation focus in the image plane, for example, by a deflection unit acting only on the excitation light but not on the emission light performing a counter movement to a deflection unit acting on both the excitation light and the emission light.

Preferably, the method according to the first aspect of the present disclosure can be combined with the method according to the second aspect of the present disclosure, which then allows to reliably localize such emitters whose axial location is not well known a priori, while at the same time further improving the utilization of emission in determining the location of isolated emitters in three-dimensionally extended samples or sample regions. In this combination, then, the steps for obtaining the estimated location of the excitable emitter include, as a step in which the axial coordinate of the estimated location is determined, an axial pre-localization step performed prior to the axial localization step and the lateral localization step, performed according to a method for axial localization of an excitable emitter according to the second aspect of the present disclosure.

It is then preferred that the lateral localization step takes place for the first time after the step of axial pre-localization, preferably immediately following, and before the axial localization step, that is in particular before an axial localization step as mentioned in connection with exclusively the first aspect of the present disclosure is carried out for the first time. For the sake of clarification, it should be noted here that the method according to the second aspect, taken by itself, is referred to in this text as axial localization, which in combination with the method according to the first aspect assumes the role of axial pre-localization and is then also referred to as such. In contrast to the axial localization according to the second aspect of the present disclosure, the term axial localization step is used in each case in connection with the first aspect; this term thus refers in each case to a step of the method according to the first aspect of the present disclosure.

Both the method according to the first aspect of the present disclosure as such and this method in combination with the method according to the second aspect of the present disclosure can be performed in such a way that the axial localization step is performed for the first time prior to performing the lateral localization step for the first time. A lateral localization according to a MINFLUX method with application of a 3D excitation donut can be performed the better the axial location of the excitable emitter is already known. In particular, localization with a 3D excitation donut in the axial direction behaves in a sense more benign than localization in the lateral direction, insofar as an uncertainty in the lateral direction is less critical for the accuracy of an axial localization. Therefore, whenever no axial localization is performed according to the method according to the second aspect or according to the indicated alternative in which a switching of the intensity distribution of the excitation light is performed as a pre-localization, it is strongly preferred to perform the axial localization step for the first time before performing the lateral localization step for the first time.

The method according to the first aspect of the present disclosure can preferably be performed iteratively. If the method according to the first aspect of the present disclosure is combined with the method according to the second aspect of the present disclosure as a method for pre-localization, the latter is at least generally carried out only once, and the iteration is then directed to the method according to the first aspect of the present disclosure that follows in the overall method. In the iterative implementation, multiple axial localization steps, multiple lateral localization steps, or both multiple axial localization steps and multiple lateral localization steps are performed. In this case, the separation of the three-dimensional localization into two separate sub-steps allows the sequence of steps to be adapted to the exact observation target and to the sample properties.

For example, after a lateral localization step, an axial localization step can be performed next just when a new estimate of the lateral location of the excitable emitter has been determined with a predetermined precision in the lateral localization step. Depending on the deviation of the actual location of the excitable emitter from the estimated location, the predetermined precision can be achieved in one or more lateral localization steps.

Further, both in connection with the application of the aforementioned precision criterion and generally in further types of an iterative implementation, it may be preferred that several lateral localization steps are performed in immediate succession. In this case, a new estimated location of the excitable emitter is then preferably determined from the estimated location of the excitable emitter and the new estimate of the lateral location of the excitable emitter obtained in a lateral localization step, which forms the estimated location of the excitable emitter for the respective following lateral localization step. This type of iterative execution is preferred, for example, when primarily a good lateral localization is desired.

In particular, if there is no preferred direction with respect to the desired localization accuracy, or even if the emitter to be localized moves in all spatial directions in the sample and if this movement of the emitter is to be tracked, it is preferred that an alternating sequence of axial localization steps and lateral localization steps is performed, wherein in each case a new estimated location of the excitable emitter is determined from the estimated location of the excitable emitter and the new estimate of the axial location or the lateral location of the excitable emitter obtained in one step, which new estimated location forms the estimated location of the excitable emitter for the respective following step.

That in each case a new estimated location is determined from the estimated location and a new estimate may mean that, for example, if the new estimate is an estimate of an axial location, a new estimated location is determined by immediately replacing the original axial coordinate with the newly estimated axial location, while the lateral coordinate is retained in this example case. However, it is also possible, for example, that the new axial coordinate of the new estimated location is determined from several previously determined estimates, that is, in particular, that the axial coordinate of the original estimated location is also taken into account in the determination of the new estimated location. Analogously, the same applies to the reverse case, where the new estimate is the estimate of an axial location, or also to cases where several axial localizations or several lateral localizations are performed in succession. In many cases, it is useful to consider not only the last value when determining the coordinate of the location for one spatial direction. This is especially true even when the emitter is moving in the sample. Then, from the series of previous axial and lateral estimates, it is possible to determine a direction and a speed of movement of the emitter and to estimate in advance the future location, i.e. the location where the emitter will be at the next following step.

The iterative procedures may preferably be performed such that the pair of sample positions more densely surrounds the estimated location of the excitable emitter in a later axial localization step than in an earlier axial localization step, or that in a later lateral localization step the central local minimum is placed at lateral sample positions more densely located around the estimated location of the excitable emitter than in an earlier lateral localization step. Both of the above measures can also be combined. That is, the basic principle of iterative MINFLUX procedures can be applied here separately for both lateral and axial localization. Accordingly, as is known for iterative MINFLUX, it is also possible to select the intensity of the 3D excitation donut in each case depending on the size of the sampling pattern, i.e., the diameter or, in the case of axial localization, the axial distance of the sample positions. Similar to a change of the intensity of the 3D excitation donut, a change of the respective observation duration has an effect, which can also be performed.

Both when the method according to the first aspect of the present disclosure is carried out and when the method according to the second aspect of the present disclosure is carried out, the respective necessary displacement of the excitation light in the axial direction can be carried out by passing an excitation light into the sample through an objective via a deformable mirror, wherein axial positioning is carried out by changing the shape of the deformable mirror. That is, when an axial localization step is performed, a positioning of the 3D excitation donut to an axial position for sequential placement to the two axial sample positions is preferably performed by deforming a deformable mirror in the excitation beam path accordingly; likewise, positioning of the 3D excitation donut at an axial position for setting a sampling pattern plane is preferably performed by deforming a deformable mirror in the excitation beam path accordingly; finally, positioning of the focused Gaussian excitation light or the 3D excitation donut for scanning at the axial localization is performed by deforming a deformable mirror in the excitation beam path accordingly. For this purpose, the deformable mirror is preferably placed in a plane of a rear aperture of the objective or a plane conjugate thereto, that is, in a plane in which a pupil of the objective may be formed.

The determination of the location from the respective measured values can be carried out in a particularly simple manner both in methods according to the first aspect of the present disclosure and in methods according to the second aspect of the present disclosure in such a way that that a vector sum is evaluated. That is, the new estimate of the axial location of the excitable emitter or the new estimate of the lateral location of the excitable emitter is obtained by evaluating a vector sum, or that a determination of the axial coordinate of the estimated location in the axial pre-localization or that the axial localization is performed by evaluating a vector sum. Preferably, the vector sum has the form $$\vec{u}(p_j, \vec{b}_j) = \frac{\sum_{j=1}^{m} p_j \cdot \vec{b}_j}{\sum_{j=1}^{m} p_j},$$

where the pi photon numbers or intensities representing the positions of the $\vec{b}_j$ of the 3D excitation donut or the focused excitation light.

In a simple calculation of this vector sum, in each of the procedures for given sampling patterns, provided that the influence of noise is disregarded and provided that no background signal is present, a certain value is obtained exactly for one actual location of a emitter within a certain range of positions each, i.e. exactly one location belongs to a calculated value. Therefore, it is possible in each case that the value of the vector sum is corrected according to a predetermined calibration function to obtain the new estimate of the axial location or the new estimate of the lateral location or, in the case of axial pre-localization, the axial coordinate of the estimated location or the axial localization. The respective calibration function to be applied can be determined from a simulation in each case.

An existing background signal, for example background fluorescence, interspersed ambient light or light scattered or reflected within the microscope, does not affect the term in the numerator of the vector sum on average, but it does affect the denominator. This means that the value of the vector sum $\vec{u}(p_j, \vec{b}_j)$ in the above form is systematically dependent on the quantity of the background signal. Preferably, therefore, the quantity of the background signal is taken into account when evaluating the vector sum. This can be done particularly easily by subtracting the value of the background signal in the denominator in the above formula. The quantity of the background signal is also preferably determined for this purpose on a sliding basis from measurement data.

Both said methods, i.e. the method according to the first aspect of the present disclosure as well as the method according to the second aspect of the present disclosure, are preferably performed in real time. This is favored by the fact that, in the case of methods according to the first aspect of the present disclosure, the new locations can be obtained in each case by evaluations of simple vector sums, or by the fact that, in the case of methods according to the second aspect of the present disclosure, the localization can be obtained from an evaluation of a simple vector sum.

Further data analysis can follow the execution of the real-time process or at any time after the execution of the real-time process. For this purpose, data obtained for the individual steps during execution are stored permanently. From such a data analysis, for example, even more precise localizations can be obtained. However, the achievable accuracy here depends on the quality of the data collected. This means that the methods according to the present disclosure not only enable better real-time evaluation, but also improved quality of the subsequent analysis results.

A microscope according to the present disclosure is characterized in that it comprises a control device arranged to control the microscope such that a method according to the first aspect of the present disclosure or according to the second aspect of the present disclosure is performed. Preferably, the control device is arranged such that both a method according to the first aspect of the present disclosure and a method according to the second aspect of the present disclosure or a combined method can be performed, depending on the choice of a user.

Particularly preferably, a microscope according to the present disclosure has a deformable mirror for axial displacement of an excitation focus, which also includes axial displacement of a 3D excitation donut, in a specimen. The deformable mirror is preferably placed in a plane of a rear aperture of the objective or a plane conjugate thereto, that is, in a plane in which a pupil of the objective may be formed.

Advantageous further embodiments of the present disclosure are apparent from the claims, the description and the drawings and the accompanying explanations of the drawings. Some of the drawings are flow charts, by means of which the processes according to the present disclosure are explained in great detail as a whole.

The claims are not to be understood to mean that only those articles, devices or methods which in each case have only all or none of the features of a subclaim in addition to the features of independent method claims 1 and 5 and device claim 25 can be possible further developments of the present disclosure. Rather, further further embodiments may result from features mentioned in the description as well as from the drawings and the associated explanations, which may take effect individually or cumulatively.

DESCRIPTION OF FIGURES AND EXPLANATION OF THE PRESENT DISCLOSURE ON BASIS OF THE FIGURES

In the following, the present disclosure will be further explained and described on the basis of embodiments shown in the figures. To clarify the differences from the prior art, the latter is first explained with reference to FIGS. 1 and 2.

Figure 1:
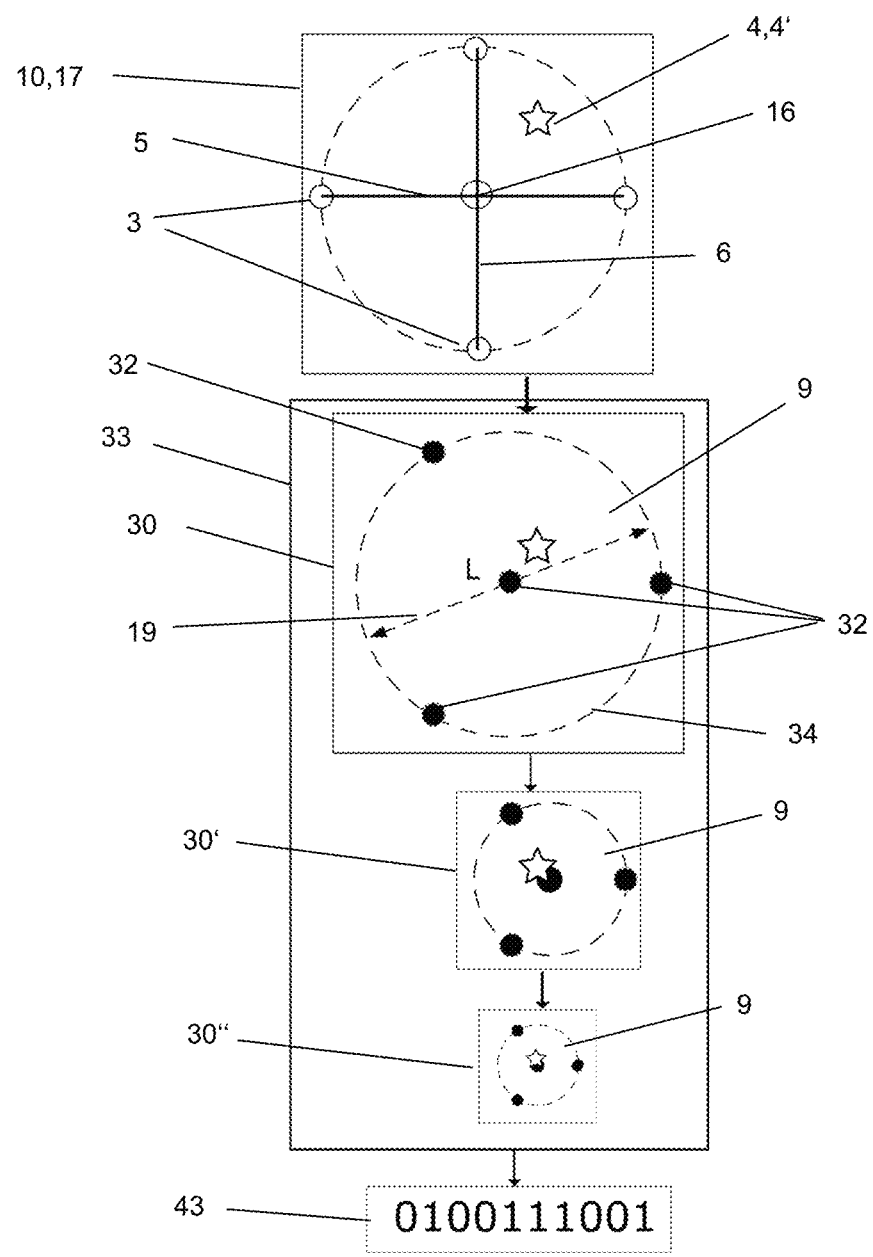
FIG. 1 shows the sequence of a localization in two dimensions according to an iterative MINFLUX method as it results from prior art.

In FIG. 1 a possible sequence of an iterative MINFLUX localization in two dimensions, as it appears in the prior art is illustrated. An isolated fluorophore 4 is exposed to a Gaussian excitation intensity distribution 3 placed at four positions around an estimated location 16 of the fluorophore, such that two of the positions are opposite each other in a first spatial direction 5 and a second spatial direction 6 with respect to the estimated location 16. A location of the excitable fluorophore in the first spatial direction 5 and in the second spatial direction 6 is determined from two measured fluorescence intensities or photon counts each. This step of a pre-localization 10, which here is a lateral pre-localization 17, is known for example from the publication "Nanometer resolution imaging and tracking of fluorescent molecules with minimal photon fluxes" mentioned in the prior art section in connection with a subsequent tracking of the motion of a fluorophore. The pre-localization 10 is followed by an iterative real-time MINFLUX localization 33, which here comprises three steps of lateral MINFLUX localizations 30, 30', 30". For a lateral MINFLUX localization 30, 30', 30", an excitation light distribution that has a local intensity minimum, ideally a null, in the lateral direction at the center of focus, referred to in short as 2D excitation donut 32, is placed at three positions on a circle around and adjacent to the location of fluorophore 4 determined during pre-localization. Thus, the sampling pattern 9 contains four scanning positions. Fluorescent light is detected until the location of the excitable fluorophore 4 can be estimated more accurately, for example by a predetermined amount, from the measurements. How this estimation is done is described in the same publication and is referred to in the prior art section. Subsequently, before performing a lateral MINFLUX localization 30', the sampling pattern 9 is shifted such that its center coincides with the location of the excitable fluorophore 4 determined in the previous step, which is closer to the actual location of the excitable fluorophore 4; the diameter 19 of the sampling pattern 9 is simultaneously reduced. Again, fluorescent light is detected until the location of the excitable fluorophore 4 can be more accurately estimated from the measurements by, for example, a predetermined amount, and then the diameter 19 of the scan pattern 9 is shifted and reduced in the same manner before finally another lateral MINFLUX localization 30" is performed. Finally, the iterative real-time MINFLUX localization 33 is followed by a final localization 43 obtained during an analysis of the measurement data obtained during the iterative real-time MINFLUX localization 33.

Figure 2:
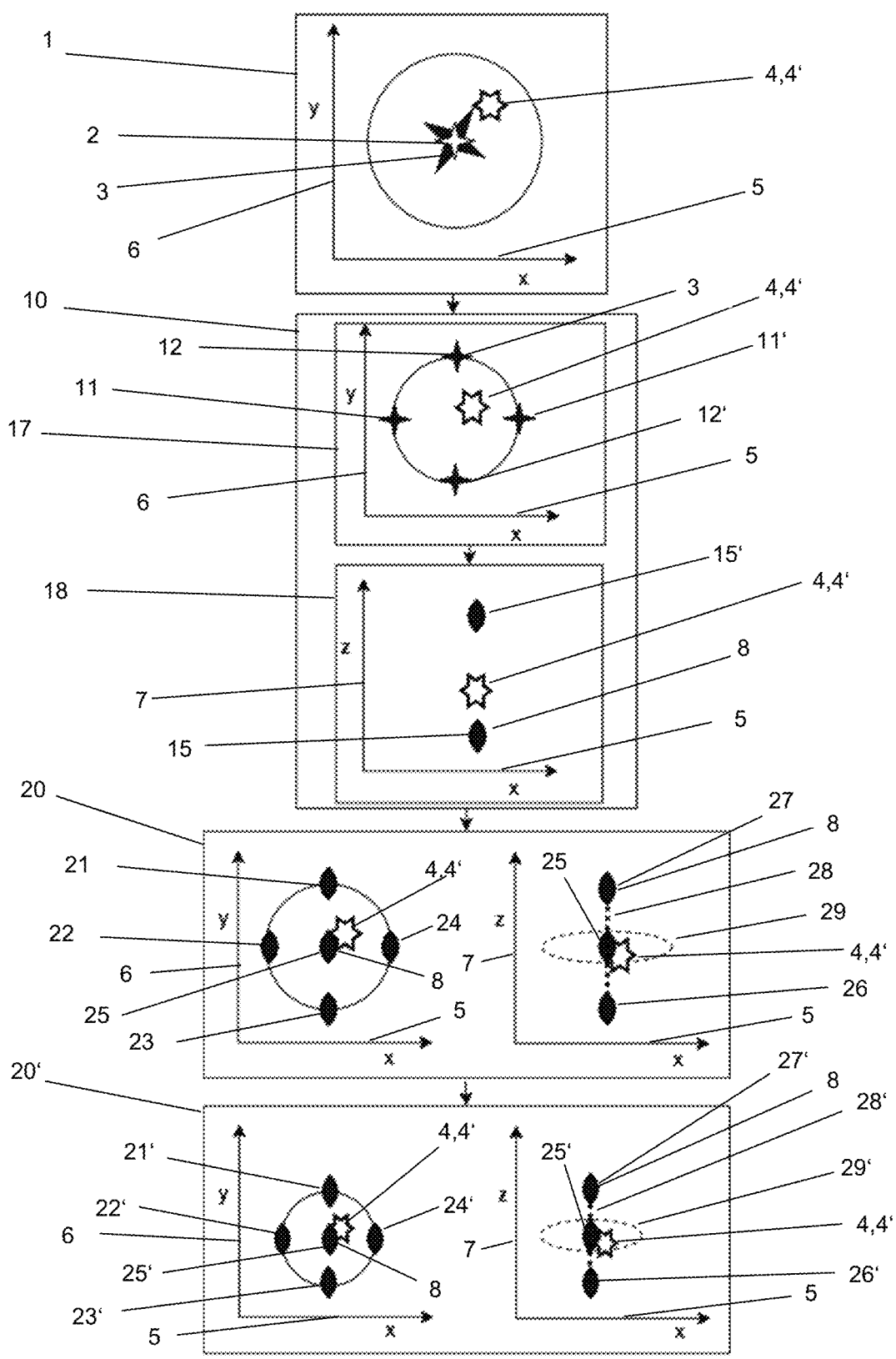
FIG. 2 is a representation of the sequence of a MINFLUX localization in three dimensions according to prior art.

In FIG. 2 a sequence of iterative real-time MINFLUX localization in three dimensions together with pre-localization steps is shown, which is essentially the same as described in the publication "MINFLUX nanoscopy delivers 3D multicolor nanometer resolution in cells" mentioned in the prior art section. In a subregion of a sample, focused activation light is used to bring an isolated fluorophore into an excitable state. Alternatively, the first step is a finding 1 of an excitable fluorophore 4. This excitable fluorophore 4 is localized in real time at a pre-localization 10 at a step to a lateral pre-localization 17 by means of a Gaussian excitation intensity distribution 3 (symbolized in FIG. 2 by a black four-pointed star) as described in connection with FIG. 1. For this purpose, the Gaussian excitation intensity distribution 3 is placed at two lateral positions 11, 11' in a first spatial direction 5 and at two lateral positions 12, 12' in a second spatial direction 6. Subsequently, the sample is exposed to focused excitation light in a step of an axial pre-localization 18, where the focus has the form of a 3D donut, i.e., where the intensity distribution has a local minimum surrounded by intensity increase regions in all three spatial directions. The sample is thus illuminated with a 3D excitation donut 8. The 3D excitation donut 8 is placed successively at a total of two axial positions 15, 15', whereby the local intensity minimum is located in the lateral direction in each case at the location determined during the lateral pre-localization 17. In the axial direction 7, the local minimum is placed along the optical axis once above and once below the expected fluorophore location. Although the distance of the two positions from each other is not explicitly stated in the aforementioned publication on the prior art, it follows from the information on the adjustment of the axial focus position of the 3D excitation donut 8 that this can be at most 400 nm. This means that if the axial location of the excitable fluorophore 4 is to be determined more accurately by this method, it must be located between the upper and lower intensity maxima of the axial intensity profile of the 3D excitation donut 8 for both positions of the 3D excitation donut 8. An axial location of the excitable fluorophore 4 is determined from the fluorescence signals measured at the axial positions 15, 15'. This pre-localization 10 is followed by a more precise 3D localization 20 performed in real time, using a sampling pattern with seven positions 21 to 27, of which five positions 21 to 25 are located in a sampling pattern plane 29, of which in turn one position is a central position 25 in the center of the sampling pattern plane 29 and four are evenly distributed on a circle around the central position 25. The sampling pattern 9 has two other positions 26, 27 lying on a sampling pattern axis 28 together with the central position 25 of the sampling pattern plane 29, so that a total of three positions 25, 26, 27 lie on the sampling pattern axis 28. The 3D excitation donut 8 is now sequentially placed at the seven positions 21 to 27 of the scan pattern 9, with the central position 25 of the scan pattern 9 being placed at the location of the excitable fluorophore 4 determined during pre-localization 10. This 3D localization 20 is followed by another 3D localization 20', in which a scaled-down but otherwise identical scan pattern 9 with positions 21' to 27' is used. This can be continued iteratively until the excitable fluorophore 4 loses its fluorescence capability. In this case, the 3D localizations 20, 20' are performed in the first spatial direction 5, the second spatial direction 6 and the axial spatial direction 7 using an estimator of the form $$\hat{r}_{mLMS}^{(k)}(\hat{\vec{p}}, \vec{\beta}) = -\frac{1}{1 - \frac{L^2 \ln(2)}{fwhm^2}} \left(\sum_{j=0}^{1} \beta_j \hat{p}_0^j\right) \sum_{i=0}^{6} \hat{p}_i \cdot \vec{r}_{b_i},$$

where the $\beta_j$ are scalar calibration values which are chosen in such a way that in an average a bias as small as possible occurs during the localization in real time. Since the course of the intensity distribution of a 3D excitation donut 8 is not spherically symmetric, this leads to the fact that the calibration values are $\beta_j$ either selected in favor of better axial location determinations in such a way that the lateral location determination is not optimal or, conversely, in such a way that the axial location determination is not optimal. Another difficulty is that the course of the intensity of a 3D excitation donut 8 along a perpendicular to the axis strongly depends on the axial distance of this perpendicular to the center of the 3D excitation donut 8. The prior art method with the above estimator consequently utilizes the emitted photons worse than is the case with the comparison method in two dimensions.

Figure 3:
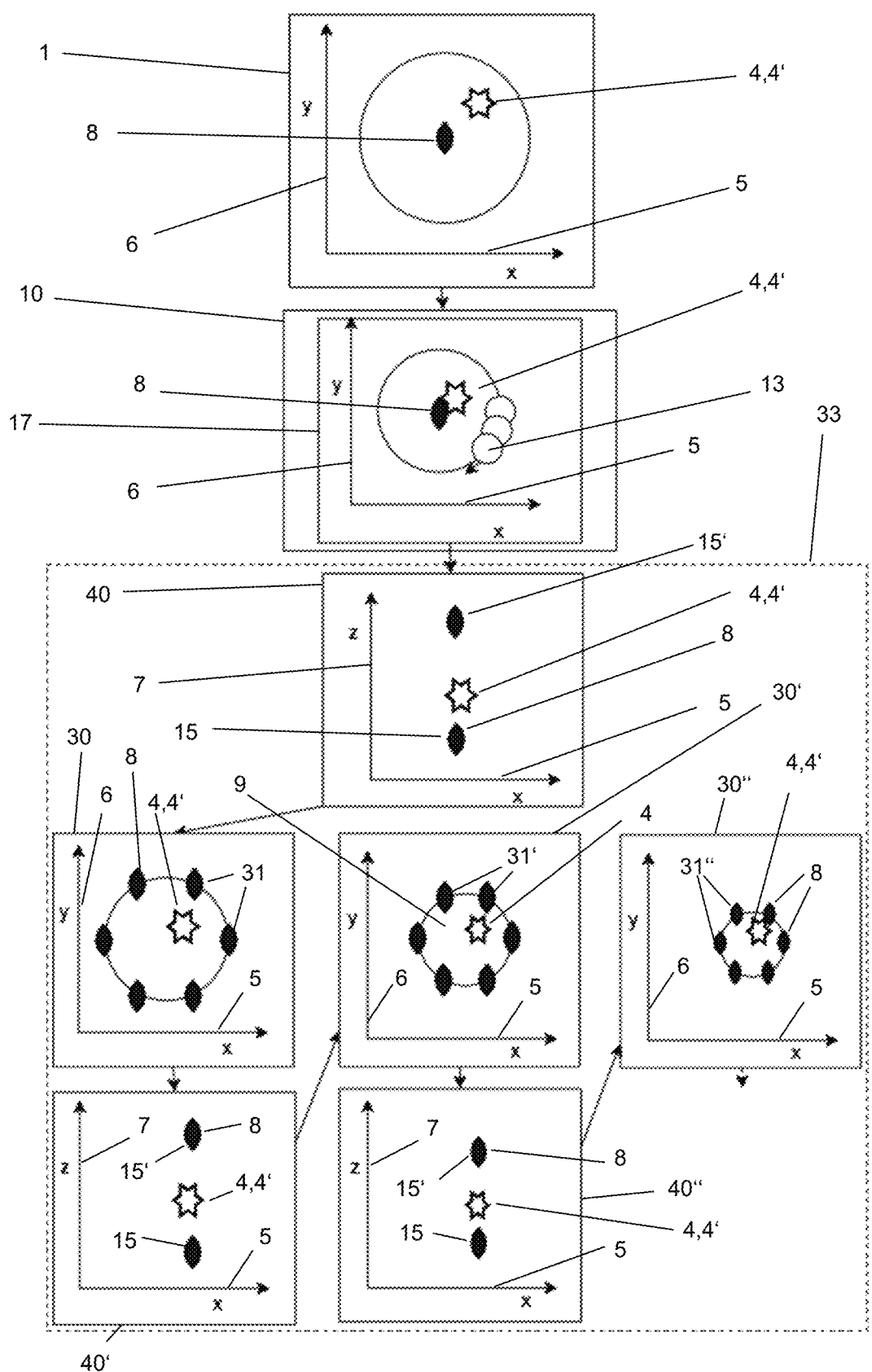
FIG. 3 is an illustration of the sequence of a MINFLUX localization in three dimensions according to one embodiment of the present disclosure.

In FIG. 3, together with pre-localization steps, a sequence of an iterative MINFLUX localization in three dimensions according to one embodiment of the present disclosure is shown. The procedure starts with finding 1 an excitable emitter 4', which is considered here exemplarily as an excitable fluorophore 4. This can be done in different ways, for example by excitation and observation in wide field or by confocal scanning of the sample. Depending on the sample, activation light can be used for the detection in addition to the excitation light. If the sample is scanned with excitation light, a Gaussian excitation intensity distribution 3 can be used for this purpose. However, a 3D excitation donut 8 can also preferably be used. This is preferred because it avoids the need for multiple light paths that can be quickly switched between. Once an excitable fluorophore 4 is located, the location of the excitable fluorophore 4 is thus usually known with an uncertainty of the order of the diffraction limit.

After the finding 1,1', a pre-localization 10 is carried out. This pre-localization 10 can also be performed when carrying out a method according to the present disclosure according to a method known from the prior art. In the embodiment shown, it is carried out using a 3D excitation donut 8, with which a lateral pre-localization 17 is carried out. The location of the excitable fluorophore 4 in a first spatial direction 5 and a second spatial direction 6 is estimated from a spatially resolved detection of the emission, i.e. of the diffraction disk in the image plane, which is located confocal to the excitation focus. Such a spatially resolved detection can be done, for example, with an array of photon counting avalanche diodes, i.e. with a SPAD array, or it can be done, as shown in the figure, by scanning the diffraction disk with a pinhole in the detection plane. It is convenient to guide the pinhole with its center on a circular path around a center or to place it sequentially at a number of at least three, for example six, preferably evenly distributed positions on such a circular path. The center thereby results as the center of the imaginary image of an imaginary point light source, which is located exactly in the center of the 3D excitation donut 8. The circular path is indicated in the figure as pinhole orbit 13 by three smaller circles drawn on a section of a circle circumference and an arrow. The diameter of the smaller circles here does not represent the diameter of the pinhole. Rather, the pinhole orbit may be large enough so that the image of the pinhole in the sample encompasses the center of the excitation focus at all times. The diameter of the pinhole orbit 13 is favorably chosen to be as large as possible, although the precise conditions may depend on the one hand on the fluorescence signal obtainable and on the fluorescence background, but in particular will also depend on practical boundary conditions. The applicant uses, for example, a device in which the 3D excitation donut 8 is both deflected by an electro-optical scanner, with the aid of which the individual points of the sampling pattern 9 are approached in each case, and is guided over a galvo scanner, which is used for scanning the sample. The galvo scanner is also in the detection beam path, but the electro-optical scanner is not. Specifically, the scanning of the pinhole orbit 13 is now performed while simultaneously holding the location of the excitation with the 3D excitation donut 8 by using the galvo scanner to sequentially place the projection of the pinhole placed in the detection beam path into the sample at the selected positions of the pinhole orbit 13, while the electro-optical scanner imposes a counter-movement on the excitation light in such a way that the 3D excitation donut remains stationary in the sample. This results in a maximum extension of the pinhole orbit 13 that corresponds to the size of the scan field that can be driven by the electro-optical scanner alone. Since in this type of localization, no matter how it is actually implemented, the 3D excitation donut 8 remains stationary and thus the excitable fluorophore 4 is always exposed to the same excitation intensity during localization, the shape of the intensity distribution of the 3D excitation donut 8 does not directly affect the quality of the lateral pre-localization 17, but at most indirectly through different signal-to-background ratios depending on the actual location of the excitable fluorophore 4 relative to the center of the 3D excitation donut 8.

The finding 1 and the lateral pre-localization 10 can also coincide in one step. For example, it is possible to target a location in the sample with the 3D excitation donut 8 in each case and to detect fluorescence in the manner described above. Depending on the signal, in particular depending on whether or how much fluorescence is detected, it can be recognized whether or not an excitable fluorophore 4 is present in the focal area of the 3D excitation donut 8. However, a location of the excitable fluorophore 4 within the focal area can also be obtained directly from the measured values obtained in this way. If no fluorescence or only a low signal is detected, another location, for example an adjacent location in the sample, can be targeted at which the aforementioned measurement is repeated.

It has been found in investigations by the applicant that iterative real-time MINFLUX localization 33 can be performed even if, during the finding 1 or the lateral pre-localization 17 or even a subsequent localization step, several excitable fluorophores 4 are actually present within the focal range of the 3D excitation donut and contribute to the signal. Then, although the location of none of the excitable fluorophores 4 present is determined with the best possible accuracy in the step in question, but some sort of average location is obtained, one of two favorable situations is likely to occur in subsequent steps. In one case, the multiple excitable fluorophores 4 are so close together that they are not separated throughout the iterative real-time MINFLUX localization 33, that is, they are together within the range of the sampling pattern 9 in which MINFLUX localization can occur with the given sampling pattern 9. Then, during the iterative real-time MINFLUX localization 33, an average location of the excitable fluorophores 4 is obtained. In particular, such a case occurs when the spacing of the contributing fluorophores is small compared to the size of the resolvable biological structures. In other cases, the multiple excitable fluorophores 4 are further apart. Then, when the excitation pattern 9 is reduced, outlying excitable fluorophores 4 get into a region where the intensity of the excitation light or the amount of excitation light actually applied to them is very large. This leads to the fact that these outer fluorophores, if they are corresponding switchable fluorophores, as is usual, are put into a dark state so that they subsequently no longer contribute to the fluorescence signal, so that finally only an isolated excitable fluorophore 4 or closely spaced excitable fluorophores 4 are localized.

Figure 4:
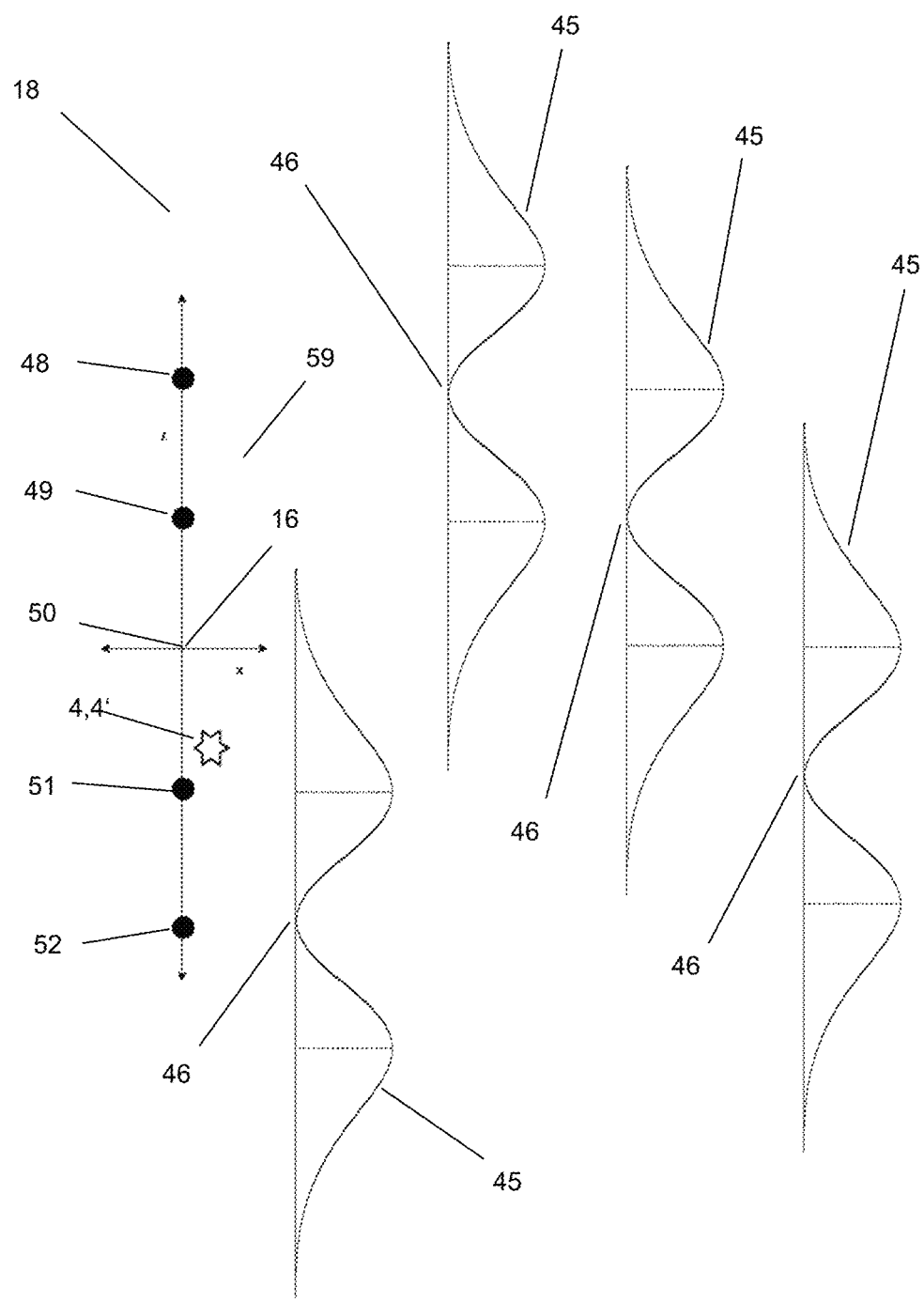
FIG. 4 is an illustration of a method for axial pre-localization according to one aspect of the present disclosure using a 3D excitation donut.
Figure 5:
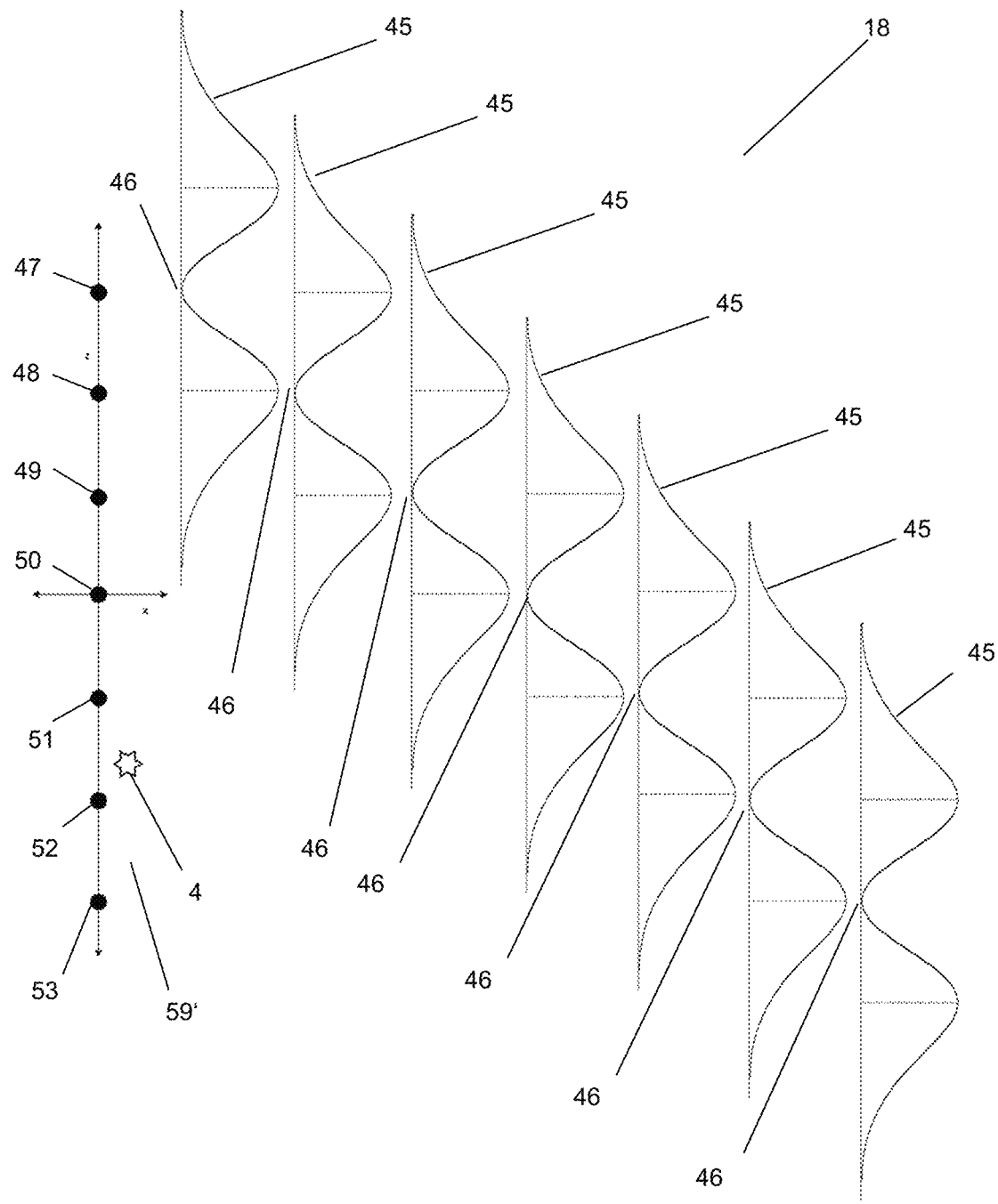
FIG. 5 is an illustration of a method for axial pre-localization according to one aspect of the present disclosure, which has a more extended capture range.

The lateral pre-localization 17 can be followed by an axial pre-localization 18. Particularly advantageous methods for performing an axial pre-localization 18 are shown in FIGS. 4 and 5 and will be explained in connection with them. However, the method illustrated in FIG. 3 assumes that the axial location of the excitable fluorophore 4 is already known with sufficient accuracy without an axial pre-localization 18 to be able to perform a MINFLUX localization without an axial pre-localization 18. Such a situation can be given, for example, if the sample to be examined is thin or if just such excitable fluorophores 4 are found during the finding 1 which were activated only during the finding 1 by means of activation light, in particular short-wave activation light, or also if an activation takes place by means of laterally irradiated thin light sheets. Then the lateral pre-localization 17 can be immediately followed by an iterative real-time MINFLUX localization 33. In contrast to the methods known from the prior art, in this embodiment of the iterative real-time MINFLUX localization 33 according to the present disclosure, a MINFLUX localization is carried out by means of an intensity profile with a central local intensity minimum surrounded by intensity increase regions in all three spatial directions, in this case specifically a 3D excitation donut 8, but nevertheless a lateral MINFLUX localization 30, 30', 30" being carried out separately from an axial MINFLUX localization 40, 40', 40" in the axial spatial direction 7, i.e. in a temporal sequence one after the other. Thereby, according to the present disclosure, when an axial MINFLUX localization 40, 40', 40" is the next step, the information obtained during a lateral MINFLUX localization 30, 30', 30" is used to optimally place the axial sample positions, i.e., positions 15, 15', with respect to the utilization of the information contained in the fluorescence photons to be detected in this next step. Conversely, when a lateral MINFLUX localization 30, 30', 30" is the next step, the information obtained in an axial MINFLUX localization 40, 40', 40" is used to place the axial sample positions 31, in particular the center of the sampling pattern 9, optimally with respect to the exploitation of the information contained in the fluorescence photons to be detected in this next step.

In the embodiment shown in FIG. 3, for a first axial MINFLUX localization 40, a 3D excitation donut 8, which is advantageously identical to the 3D excitation donut 8 used in the lateral pre-localization 17, is placed at two positions 15, 15' which lie along a perpendicular to the focal plane of the lateral pre-localization 17, one below and the other above the focal plane. The position of the perpendiculars in the first spatial direction 5 and the second spatial direction 6 thereby corresponds to the lateral location of the excitable fluorophore 4 determined during the lateral pre-localization 17, which usually does not correspond exactly to the actual lateral location of the excitable fluorophore 4. The axial distance is selected such that an axial location of the excitable fluorophore 4 can be determined from the fluorescence values measured at the two positions 15, 15'. A corresponding step is known from the prior art and is described in FIG. 2 as axial pre-localization 18. For this purpose, the lower position 15 is selected in such a way that it lies below the actual axial location of the excitable fluorophore 4 with sufficient certainty, for example with a probability of about 90% or more, and correspondingly the upper position 15' lies above this axial location. The maximum distance of both positions 15, 15' from each other, which is suitable for MINFLUX localization, results from the fact that the excitable fluorophore 4 should ideally be located in each case close to the central minimum of the 3D excitation donut 8 and in any case should not be impinged by a region of the 3D excitation donut 8 with maximum intensity or a region which is further away from the central minimum than a first local axial maximum of the 3D excitation donut 8. An axial location of the excitable fluorophore 4 is determined from the numbers of photons or intensities measured at positions 15, 15'. Subsequently, a lateral MINFLUX localization 30 is performed. For this purpose, the 3D excitation donut 8 is placed in a plane perpendicular to the optical axis at six lateral probe positions 31 arranged regularly on a circle whose center corresponds to the location of the excitable fluorophore 4 determined during the lateral pre-localization 17. The plane of the lateral sample positions is placed so that their axial position corresponds to the location of the excitable fluorophore 4 determined during the axial MINFLUX localization 40. This ensures that the lateral intensity profile of the 3D excitation donut 8 has a local intensity minimum that is as pronounced as possible that is well suited for lateral MINFLUX localization 30. The sampling pattern used in this step has just no sample positions outside the plane of the lateral sample positions 31. In the embodiment shown, this lateral MINFLUX localization 30 is again followed by an axial MINFLUX localization 40', which is performed in accordance with the first axial MINFLUX localization 40; the axial positions 15, 15' at which the 3D excitation donut 8 is placed in this axial MINFLUX localization 40' are chosen such that the center between the two positions 15, 15' corresponds in the axial direction to the axial location of the excitable fluorophore 4 obtained in the previous axial MINFLUX localization 40, and such that their lateral position corresponds to the location of the excitable fluorophore 4 obtained in the previous lateral MINFLUX localization 30. Accordingly, in the embodiment shown, a further lateral MINFLUX localization 30', a further axial MINFLUX localization 40" and a final lateral MINFLUX localization 30" follow. All localizations are performed in real time according to the MINFLUX principle using a suitable estimator. As in the prior art, in many cases the iterative real-time MINFLUX localization 33 can and will be followed by a final localization 43 obtained as part of a subsequent data analysis. This is not shown in this figure.

The separation of the MINFLUX localization in three spatial directions into axial MINFLUX localizations 40, 40', 40' and lateral MINFLUX localizations 30, 30', 30' offers the possibility to iteratively perform, for example, two axial MINFLUX localizations in immediate succession. For example, it may be advantageous to perform a second axial MINFLUX localization 40' after the first axial MINFLUX localization 40, wherein between the two axial MINFLUX localizations 40, 40' only the distance between the respective positions 15, 15' or the axial position of the center point between the two positions 15, 15' is changed, but not the lateral position of these positions 15, 15'.

This can be advantageous because in a 3D excitation donut 8 generated by means of a annular phase plate, a radial intensity profile strongly depends on the axial position of the radial section, while an axial intensity profile 45 depends less on the radial position. This means that with regard to the utilization of the information contained in the fluorescence photons, it may be favorable to first determine the axial location with low uncertainty before performing a lateral MINFLUX localization 30. That an iterative location determination is favorable in each case as a rule, even in the case of a location determination in only one spatial direction, was shown in the publications on the prior art.

As a rule, in the iterative MINFLUX method 33 according to the present disclosure, each individual localization is based on a measurement at sample positions which lie around the previously estimated location of the excitable emitter, which in particular can be a fluorescent emitter or a fluorophore 4, whereby the sampling pattern just does not contain a sample position at the location of the excitable emitter. The reason for this is that, in general, according to the inventors observation, real-time localization without a measurement at the center of the sampling pattern is more successful than with a method according to the scientific publications cited to the prior art. With regard to the method according to the present disclosure described herein, this also more easily offers the possibility of separating the MINFLUX localization in each case into an axial and a lateral MINFLUX localization, since the measurement in the center is not required for a calibration of an overall localization performed in real time. This does not exclude, however, that also when carrying out a method according to the present disclosure in individual steps or in all steps, a measurement is also carried out at a central position. This measurement can advantageously be carried out for control purposes, in particular with regard to a check to the background signal, for example an estimation of the size of the background signal, or with regard to a detection whether one or more excitable fluorophores are located in the detection area. Usually, the determination of the location of the excitable fluorophore 4, or in general the excitable emitter, will not directly depend on this measured value in the center. This is not to say that the separation of the localization according to the present disclosure into an axial MINFLUX localization 40, 40', 40" and a lateral MINFLUX localization 30, 30', 30" is not also possible if the determination of the location of the excitable fluorophore 4, or in general of the excitable emitter, is also directly based on a measurement in the center.

In FIG. 4 a sequence of an axial pre-localization 18 is shown. A 3D excitation donut 8 is used for the pre-localization, preferably the same 3D excitation donut 8 that is subsequently used for an iterative real-time MINFLUX localization 33. The 3D excitation donut 8 has an effective axial intensity profile 45 with a central local minimum 46. The effective axial intensity profile 45, when only the excitation profile is axially displaced but the detection aperture remains stationary, corresponds to the actual intensity profile in the sample. If the detection aperture is axially displaced together with the excitation profile, the effective axial intensity profile 45 is a product of the detection point spread function and the actual axial intensity profile. In practice, any aberrations that occur must also be taken into account.

A typical 3D excitation donut 8 has maxima in the radial direction in the focal plane, the spacing of which is large compared to the corresponding spacing for a 2D excitation donut, for example, may be 520 nm for an excitation wavelength of 642 nm. Depending on the width of the 3D excitation donut 8, axis-parallel intensity profiles 45 are very similar for a range of radial distances from the axis. For the example of an effective intensity distribution 44 shown as a contour plot in FIG. 6 and explained in more detail later, this is true for distances up to more than ±100 nm. The value in the local minimum also increases only slowly within this range with greater distances from the axis. The method shown in FIG. 4 can be used if, after finding 1 and, if necessary, after a lateral pre-localization, the lateral location is known with an uncertainty fitting the range of radial distances sketched above, and the axial location of the excited fluorophore 4, or in general of the excited emitter 4', is known with an uncertainty of up to slightly more than half the distance of the maxima of the effective intensity profile 45.

Let the estimated location 16 of the excitable emitter be at the axial sample position 50. Then, in the illustrated embodiment, the 3D excitation donut 8 is sequentially placed at four axial sample positions along the optical axis, axial sample position 48, axial sample position 49, axial sample position 51, and axial sample position 52. The set of axial sample positions 48, 49, 51, 52 thereby forms an axial sampling pattern 59, omitting a central axial sample position 50 corresponding to the estimated location 16 of the excitable emitter. The axial sample positions 49 and 51 thereby have a distance from the estimated location 16 of the excitable emitter 4 which corresponds to the distance of the central local minimum 46 from a maximum of the effective intensity profile 45, for example 360 nm, this distance depending, among other things, on the wavelength of the excitation light used and on the refractive index of the sample. The axial sample positions 48 and 52 are each twice the distance from the estimated location 16 of the excitable emitter 4. From the set of emission readings obtained in this manner, an axial location of the excitable emitter 4 can be reliably estimated. For example, if a vector sum is formed over the measured values, each actual location of the excitable emitter 4' is assigned an estimated value, with an estimated value being assigned to exactly one location in each case. This is ensured by the choice of the distances between the axial sample positions. The distances can also be chosen smaller, but preferably not larger. The concretely specified distances are a particularly good choice in that with them the capture range, i.e. the range in which a fluorophore must be located so that it can be localized with the method, is very large in relation to the number of sampling points. Because of the uniqueness of the assignment, via a calibration using, for example, a simulation calculation, the vector sum can be modified using a correction function such that the obtained estimator estimates the true location of the excitable emitter 4' without a bias. In the absence of background emission, two axial sample positions, which should be widely separated, would in principle suffice for axial localization of a single excitable emitter 4' present. Practically, in the case the emitter being a fluorescent emitter however, it can be necessary to excite the fluorescent emitter to be localized comparatively strongly relative to the background during the localization process. This is achieved by means of the chosen four scanning positions. For example, a fluorophore which actually has the estimated location 16 is detected with intensity maxima of the 3D excitation donuts 8 placed at the axial sample positions 49 and 51. The excitation intensity experienced by the excitable emitter 4', in particular the fluorophore 4, from one of the two further spaced 3D excitation donuts 8 then increases with increasing distance from this position.

In FIG. 5 a sequence of a further axial pre-localization 18 is shown. In this case, the requirement for prior knowledge of the axial location of the excitable emitter 4', which is imposed in the previously described method, does not have to be fulfilled. The method is therefore particularly suitable, for example, for localizing excitable fluorophores 4 that have been pre-localized laterally by means of a wide-field localization method with a small depth of focus.

Figure 13:
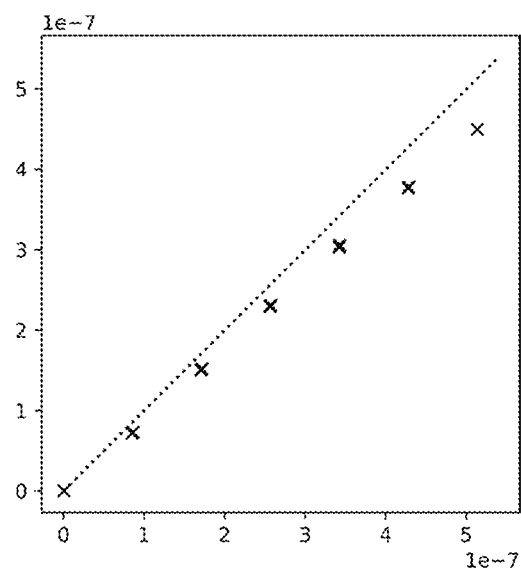

In this method, too, axial sample positions have distances from each other that correspond to the distance of the central local minimum 46 from a maximum of the effective intensity profile 45. Again, the chosen distances are particularly suitable distances, but in principle smaller distances can be chosen. The central axial sample position 50, which may correspond to the estimated location of the excitable emitter 4', is not omitted from this procedure. The number of axial sample positions is at least six, specifically shown are seven, but the number can be chosen larger. Limits are set here by the apparative possibilities to shift the excitation focus in axial direction relative to the sample, as well as by occurring optical aberrations. By using an odd number of axial sample positions 47-53 and the location of a central axial sample position 50 at the estimated location 16 of the excitable emitter 4', it is achieved that the capture range within which an axial localization can be performed is symmetrical to the estimated location 16 of the excitable emitter 4'. An unambiguous determination of the axial location of the excitable emitter 4' is possible with this method in any case if there are two axial sample positions in both directions from the actual location of the excitable emitter 4'; calculations for the axial sampling pattern 59' formed by the set of all axial sample positions 47 to 53, the results of which are shown in FIG. 13, show that the capture range is even larger. In the concrete example shown, an excitable fluorophore can thus always be reliably localized in any case if it is actually located within the range between the axial sample positions 48 and 52. In the case shown, the excitable emitter 4' is located directly between the axial sample positions 51 and 52. Axial localization can again be performed by means of a calibrated vector sum.

In a simple realization, a two-step approach can be taken by first roughly determining the axial location and then performing the more precise location determination by performing a vector sum of the measured values to four of the axial sample positions chosen so that the arrangement used for this evaluation corresponds to that shown in FIG. 4. The measured value for an axial sample position adjacent to the roughly estimated location of the excitable emitter 4' is then not evaluated, while the then remaining nearest two neighbors in each axial direction are evaluated; thus, in the case shown, axial sample positions 49, 50, 52, and 53 would be evaluated. Insofar as the rough estimate is ambiguous as to whether the excitable emitter 4' is located just above or below an axial sample position, for example the axial sample position 51, this is harmless. Then exactly this sample position, in the described (not shown) example the axial sample position 51, is not considered for the more precise axial localization. In general, the sample position closest to the roughly determined location of the excitable fluorophore can be disregarded for the more precise localization.

The displacement of the 3D excitation donut 8 to the axial sample positions 47-53 can take place, both in the embodiments explained in connection with FIG. 4 and in connection with FIG. 5, on the one hand in such a way, that in each case also the projection of the pinhole or generally of structures in the detection plane is displaced into the sample together with the 3D excitation donut 8 or on the other hand just in such a way that the projection of the pinhole or of structures in the detection plane remains fixed in the plane of the estimated location 16 of the excitable emitter 4'. Solutions are also conceivable in which the projection of the pinhole or of structures in the detection plane is displaced to a different extent than the 3D excitation donut 8. If only the 3D excitation donut 8 is displaced, the actual intensity profile of the excitation light in the sample is decisive for determining the distances of the axial sample positions, i.e. for determining the axial sample positions. If the projection of the pinhole or detection structures in the detection plane such as detector elements of a detector locally resolving a diffraction image is displaced together with the 3D excitation donut 8, the effective intensity profile 45 resulting from a product of the actual intensity profile of the excitation light with a point spread function of the detection is decisive.

In particular, if the spacing of the axial scan positions 47-53 is smaller than in the examples shown, and thus more scan points are selected in relation to the capture range, it is not necessary for there to be a central axial scan position 50 that coincides with the estimated location 16 of the excitable fluorophore.

In many cases, by repeating the MINFLUX localization step or steps with the smallest sampling pattern 9 or the smallest sampling patterns 9, a highly accurate localization, i.e., a highly accurate determination of the location of the excitable fluorophores 4, can be performed multiple times. This means that the procedure can be carried out iteratively, whereby, in particular in the case of small sampling patterns 9, a further reduction of the sampling pattern 9 from one step to the next following step, in which a localization is carried out in the same orientation, i.e. laterally or axially, is dispensed with. In many cases, a lower uncertainty of the location determination is nevertheless achieved in the steps carried out later.

Figure 6:
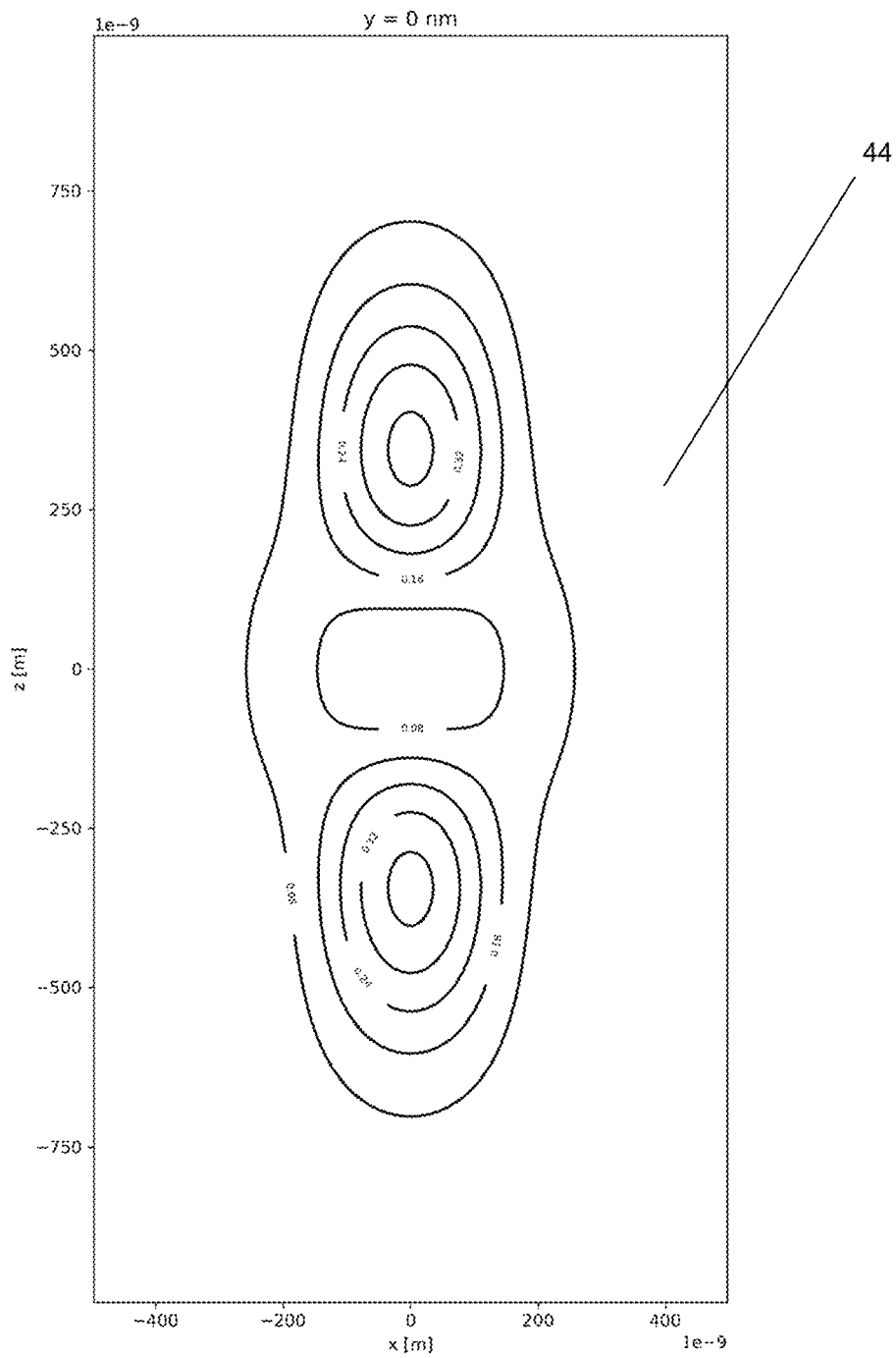
FIG. 6 is a contour plot of a section of an effective intensity distribution of a 3D excitation donut 8 along an optical axis.

In FIG. 6 a contour plot of a section of a calculated effective intensity distribution 44 of a 3D excitation donut 8 is shown. For the calculation, it was assumed that the central minimum of the 3D excitation donut 8 is displaced both axially and laterally together with the detection aperture, so that the detection aperture and the central minimum are always confocal to each other. Further, an excitation wavelength of 642 nm and a certain diameter of the detection aperture, i.e. a confocal pinhole, not specified here, were assumed. For the chosen parameters, the actual spacing of the lateral maxima of the 3D excitation donut 8 is about 520 nm, while in the depicted effective intensity distribution 44 it is about 400 nm. These lateral maxima cannot be inferred from the contour plot shown, simply because no closed contour exists for the associated maxima value in the axial section. In the contour plot it can be seen that a line close to the center of the same effective intensity has approximately the shape of a rectangle with rounded corners. Above and below it are areas with egg-shaped lines of the same effective intensity. From the contour plot, it can be further seen that an axial intensity profile has two distinct maxima. It can be seen that intensity profiles to radially displaced parallels to the axis have a pronounced minimum and two plateau-like maxima regions each, with the center of the plateau in the axial direction at nearly the same position as the maximum on the axis. This applies to a range of about ±100 nm. For the more practically relevant case where the detection aperture is stationary in the lateral, i.e. radial, direction, when the 3D excitation donut 8 is axially displaced for axial pre-localization 18, this range where axial effective intensity profiles 45 exhibit the above properties is actually wider. The same applies if a very large detection aperture, i.e., if no confocal detection is used. Provided that the lateral location of an excitable emitter 4' is known with an uncertainty corresponding to the width of the range, it can be axially pre-localized by means of the 3D excitation donut 8.

In FIG. 7 to FIG. 10 results of various simulation calculations for axial pre-localization 18 using a 3D excitation donut 8 are shown. In each case, the result of the calculation of the axial coordinate of a vector sum of photon numbers or emission intensities $p_j$, which are calculated for different scanning positions $\vec{b}_j$, under the respective assumed measurement conditions, is plotted over the assumed axial location of the excitable emitter or excitable fluorophore. The vector sum can be written as $$\vec{u}(p_j, \vec{b}_j) = \frac{\sum_{j=1}^{m} p_j \cdot \vec{b}_j}{\sum_{j=1}^{m} p_j}.$$

For all axial coordinates for which a calculation was performed, calculations were performed in each case for several radial coordinates within a range corresponding to radial distances from the optical axis of 0 to 100 nm. For each value of the abscissa consequently several values of the ordinate are determined, whereby the calculated values can coincide also very closely. For the abscissa value 0, the values always coincide exactly for reasons of symmetry. The scale of the axes is $10^{-7}$ m, i.e. $10^2$ nm, a value of 1 thus corresponds to 100 nm.

Figure 7:
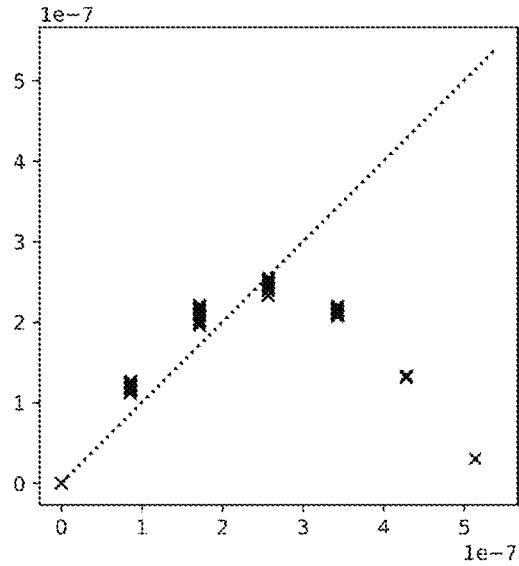
FIGS. 7-10 give results of simulation calculations for the determination of an axial location of an excitable emitter using a 3D excitation donut and different scanning patterns.

The representation of FIG. 7 is based on an assumed axial sampling pattern with two scanning points at which the central local minimum of the 3D excitation donut 8 is placed, each at a distance of 256 nm above and below a center. This distance corresponds to about one fourth of the distance between the maxima of an axial intensity profile of a 3D excitation donut 8 used as a basis for the simulation. Further, observation conditions were assumed under which the effective intensity distribution 44 coincides with the actual intensity distribution in the sample. Under these conditions, no distinction can be made between layers of an emitter as a fluorophore closer than about 260 nm or farther than 260 nm from the center. Axial localization or axial pre-localization 18 based on a simple vector sum is therefore possible based on the assumed axial scan pattern and the assumed initial conditions only if the axial location of the excitable emitter is known in advance to better than about ±260 nm This range within which unambiguous localization is possible is referred to hereinafter as the capture range or capture range of the axial sampling pattern.

Figure 8:
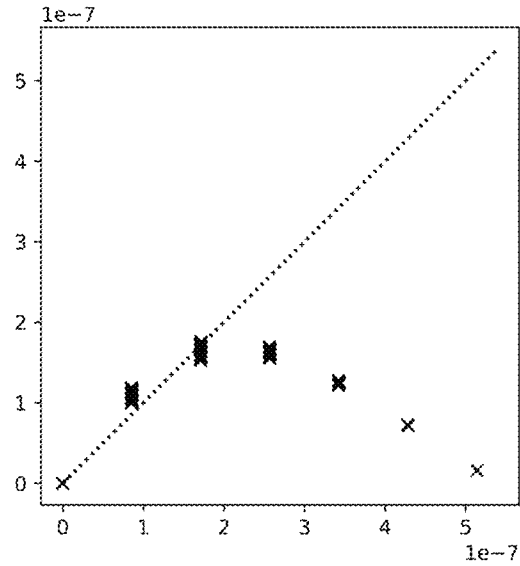

The representation in FIG. 8 is based on an assumed axial sampling pattern with three scanning points. In addition to the scanning points of the axial sampling pattern of FIG. 7, the axial sampling pattern used here also contains a scanning point in the center. It can be seen in the plot that the capture range of this axial sampling pattern for an evaluation based on a simple vector sum is smaller than that of an axial sampling pattern with only two scanning points.

Figure 9:
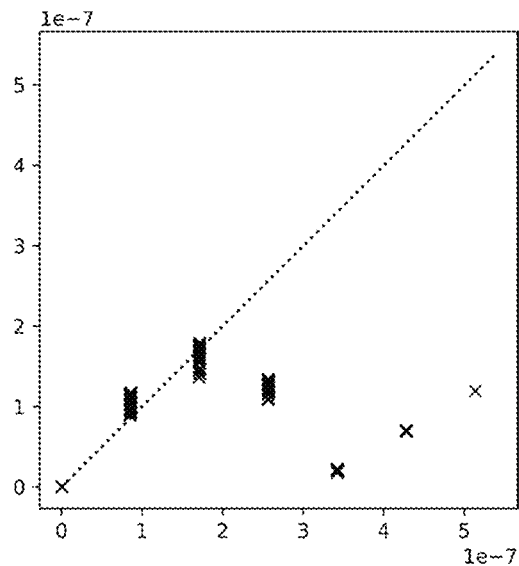

The representation of FIG. 9 is now based on an assumed axial sampling pattern with two scanning points, which corresponds to the axial sampling pattern of FIG. 7. The simulation was modified with respect to the observation conditions in that an observation by means of a confocal pinhole shifted axially with the 3D excitation donut 8 was assumed. In this case, an effective axial intensity profile 45 is effective, the maximum distance of which is reduced compared to the intensity profile on which the simulation for FIG. 7 is based. Accordingly, for FIG. 9, sampling points were assumed at a distance of 180 nm from a center. The course of the data curve corresponds to a reduced course of the data curve from FIG. 7 supplemented by a section not included in FIG. 7. The capture range is reduced to about ±180 nm in accordance with the change in the effective axial intensity profile 45 compared to the intensity profile used as a basis for FIG. 7.

Figure 10:
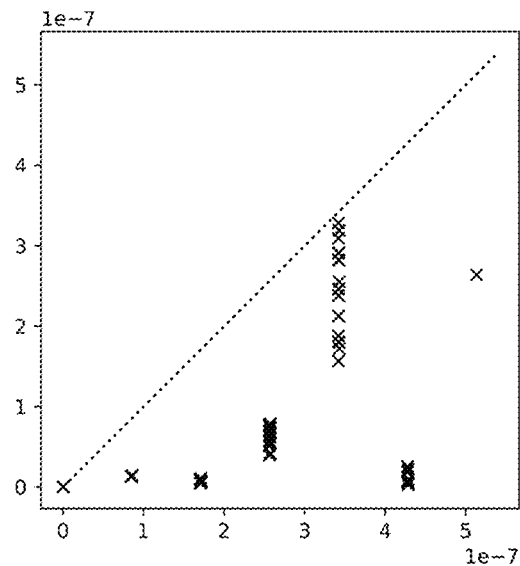

The representation of FIG. 10 is now also based on an assumed axial sampling pattern with two scanning points and observation conditions as for FIG. 9, but the distance of the two scanning points to the center has been doubled, i.e. increased to 360 nm. The two scanning points thus have a distance from each other that corresponds to the distance between the maxima of the effective axial intensity profile 45 of the 3D excitation donut 8. It can be seen from the illustration that this axial sampling pattern is not suitable for localizing an emitter, for example a fluorophore, on the basis of a vector sum, since, in particular for emitters located close to the center of the axial sampling pattern, the values obtained from the vector sum depend only weakly on the actual location of the fluorophore.

Figure 11:
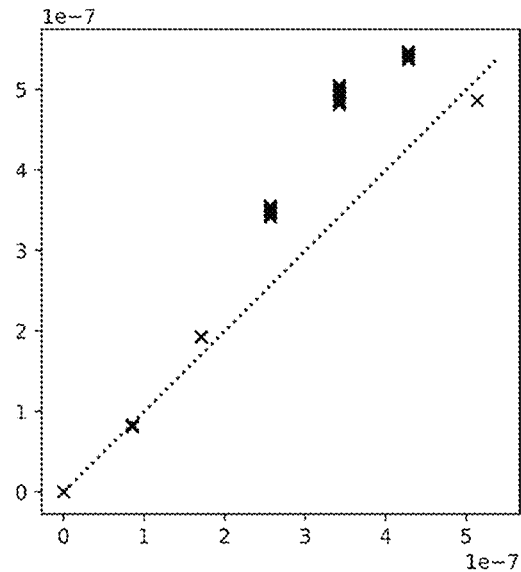
FIGS. 11-13 show corresponding results for preferred scanning patterns with extended capture range.
Figure 12:
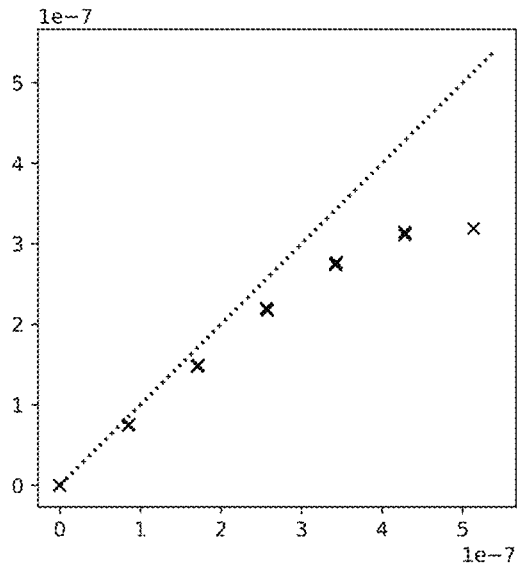

FIG. 11 to FIG. 13 show results of various simulation calculations for axial pre-localization 18 with extended capture range using a 3D excitation donut 8. All three illustrations are directed to observation conditions as assumed for FIG. 9, i.e. with an axially co-moving confocal pinhole or an equivalent detection scheme. On the basis of FIG. 10 it was shown that a relevant extension of the axial capture range compared with the axial capture range known from the prior art, which corresponds approximately to the capture range according to FIG. 9, is not possible simply by bringing the scanning points, whose measured values are evaluated ratiometrically, to a greater distance from each other. The inventor has now found that by means of scanning the sample in the axial direction with a 3D excitation donut 8, an accurate axial pre-localization 18 within an extended axial capture range 61 can be achieved in a surprisingly simple manner. For this purpose, a scanning with axial sample positions is selected, the distance between which is not greater than half the distance between the maxima of the effective intensity profile 45, whereby no sampling point has to be located at a central sample position, so that the distance between two central axial sample positions can correspond to the distance between the maxima of the effective axial intensity profile 45. Concrete examples also concerning the evaluation of the data obtained during a scan have already been explained above with reference to FIGS. 4 and 5.

The axial sampling pattern assumed for FIG. 11 corresponds to the axial sampling pattern assumed for FIG. 10, supplemented by a further sampling point above and below each at a distance of 360 nm, i.e. half the distance between the maxima of the effective axial intensity profile 45 of the 3D excitation donut 8; the axial sampling pattern consequently has four sampling points, two of which lie at a distance of 360 nm above and below the center of the axial sampling pattern and two others at a distance of 720 nm above and below the center of the axial sampling pattern. This sampling pattern on which the simulation is based thus corresponds to the axial sampling pattern 59 shown in FIG. 4. The axial capture range 61 of this axial scan pattern 59 for an evaluation based on a vector sum is about ±400 nm, which means that fluorophores can still be unambiguously localized even if they lie up to about 10% of the scan point distance outside the range between the inner scan pattern points. From the fact that the point clouds associated with the individual abscissa values span a somewhat wider range of values, particularly at the edge of the capture range, it can be seen that the axial value obtained from the vector sum for a given axial location of a fluorophore depends on the lateral location of the fluorophore. The fundamental deviation of the axial location obtained from the vector sum from the underlying axial location can be compensated by a calibration curve, so that after calibration the value obtained from the vector sum reflects the actual location of the fluorophore without a systematic error. The dependence on the lateral location leads to an uncertainty of the axial localization. On the other hand, the large slope of the curve, which means that the vector sum overestimates the axial distances to the center of the axial scan pattern 59, is favorable because this means that the vector sum is sensitive to a change in the location of the fluorophore.

For FIG. 12 an axial sampling pattern was used as basis, which is derived from the one used for FIG. 11 by adding a scanning point in the center. The capture range of this axial sampling pattern is even extended beyond ±500 nm, although the sensitivity to the location of the fluorophore is only low from about ±400 nm towards the edge. This axial sampling pattern has the advantage that within the investigated radial range of ±100 nm, the axial location obtained from the vector sum shows no dependence on the radial location of the fluorophore visible in the representation of the data.

For FIG. 13 an axial sampling pattern was used as basis, which is derived from the one used for FIG. 12 by adding a further scanning point at each edge. The axial sampling pattern thus obtained corresponds to the axial sampling pattern 59' shown in FIG. 5. The simulation proves that the capture range of this axial sampling pattern covers the full range for which simulation calculations were performed, i.e. of more than ±500 nm. Based on the basic considerations presented in connection with FIG. 5, it can be assumed that the capture range is actually at least about ±720 nm. Based on the simulation results shown in FIG. 12, it may be further assumed that the capture range is actually even larger Overall, the results shown in FIGS. 11 to 13 demonstrate that a 3D excitation donut 8 is surprisingly well suited for axial localization of a fluorophore whose lateral location is known with an uncertainty of at least up to ±100 nm.

The simulation calculations on which the representations of FIGS. 7 to 10 and 11 to 13 are based do not explicitly include the effects of the photon noise and the background signal. However, the applicant is aware from other studies that the vector sums depend on the background signal in each case. This can be seen simply by looking at the vector sum $$\vec{u}(p_j, \vec{b}_j) = \frac{\sum_{j=1}^{m} p_j \cdot \vec{b}_j}{\sum_{j=1}^{m} p_j}.$$

A background signal that can be considered constant over the entire axial sampling pattern, at least to a good approximation, does not cause a change in the vector in the numerator of the above equation, but it does cause a change, namely an increase, in the denominator. Therefore, the larger the background signal, the smaller the length of the calculated vector. For this reason, the applicant has developed a method which allows a correction with respect to the background signal during the execution of the MINFLUX measurements. This method is the subject of the European patent application with file number 21190113.7, now published as EP 3 951 470 A1. The entire contents of this European patent application are hereby incorporated by reference into the present application. According to the method described in said patent application, a mean background signal is determined on a sliding basis during the measurement. This background signal is now taken into account by subtracting it in the denominator. Hereby a corrected vector sum is obtained whose value no longer systematically depends on the background signal. The calibration of the localization can then be done by applying a calibration function, as explained above. This can be described for example by a polynomial or a look-up table.

The influence of the photon noise depends directly on the number of measured photons. In this respect, the applicant has carried out further simulations which show, for example, that by means of the scanning scheme with five scanning points and axially co-moving confocal pinhole on which FIG. 12 is based, an axial localization with an uncertainty between 20 nm and 35 nm, depending on the location of the emitter within the considered volume, is achieved with the detection of only 400 photons over an axial capture range of about ±500 nm for emitters within a lateral range of ±100 nm each in a first direction and in a second direction orthogonal to the first. This is certainly sufficient to subsequently perform, for example, an iterative real-time MINFLUX localization of fluorophores in three dimensions.

Furthermore, the applicant is aware from experiments that in particular for an axial sampling pattern with five points as used for FIG. 12, a deviation of the actual sampling pattern distances from those used for the simulations can be tolerated. Thus, aberrations occur in real samples that lead to distortions of the effective axial intensity profiles 45. These distortions depend on the axial position considered. Nevertheless, with the aforementioned methods for axial pre-localization 18, especially in combination with a correction of the aberrations, the applicant succeeds in pre-localizing fluorophores axially with sufficient accuracy to subsequently perform an iterative real-time MINFLUX localization 33 in three dimensions.

Figure 14:
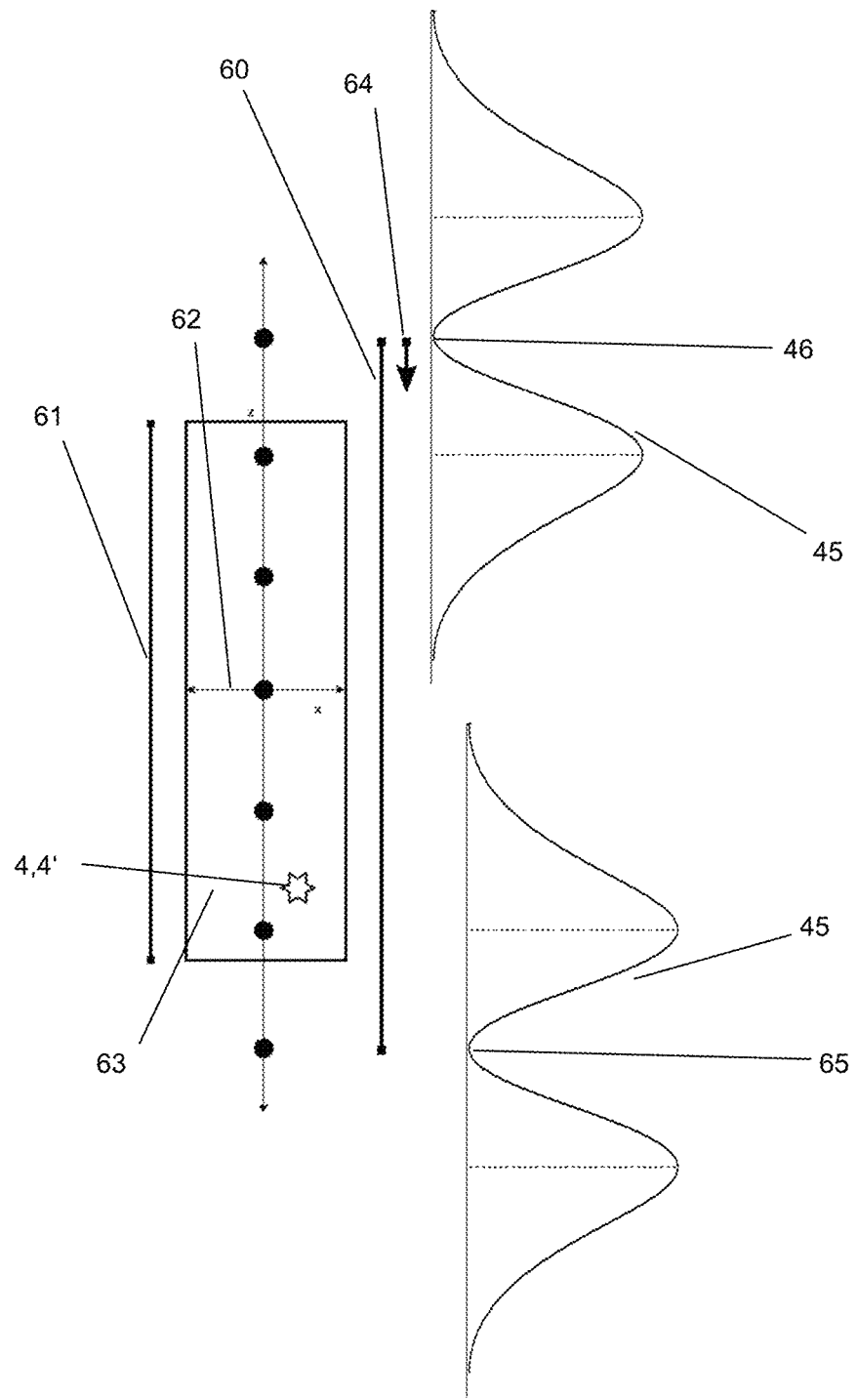
FIG. 14 is an illustration of another method for axial pre-localization with an extended capture range based on continuous or finer raster scanning with a 3D excitation donut.

FIG. 14 illustrates another scanning method for axial pre-localization 18 using a 3D excitation donut 8. While the methods explained on the basis of FIGS. 4 and 5 are based on a discrete sampling pattern with as large a spacing as possible in order to achieve the largest possible axial capture range 61 with a small number of sampling points, this method relies on a more finely gridded or continuous scanning motion. An axial scanning range 60 is scanned with the 3D excitation donut 8, with the central local minimum 46 of the effective axial intensity profile 45 sweeping the entire axial scanning range. Here, the displacement 64 of the central local minimum 46 may be in discrete steps or continuous. In accordance with one aspect of the present disclosure, the axial scanning range 60 here is larger than the spacing of the maxima of the axial effective intensity profile 45. In the method illustrated in FIG. 4, the axial scanning range 60 (which is not specifically noted there for clarity) is twice the spacing of the maxima of the axial intensity profile 45; in those illustrated in FIGS. 5 and 14, it is three times the spacing of the maxima of the axial intensity profile 45. An axial capture range 61 results from the axial scanning region 60. An excitable emitter 4' can now be axially pre-localized in any case if it is located within a pre-localization volume 63, which here results as a cuboid or cylinder from a lateral pre-localization region 62 and the capture range 61. The lateral pre-localization area 62 depends on the effective intensity distribution 44, for which an example is shown in FIG. 6. It may, as follows from further explained above, comprise a square with an edge length of twice 100 nm or a circular area with a radius of more than 100 nm. If the scanning movement is continuous, photons detected during a part of the scanning movement can be cumulatively detected and assigned to the swept area. The determination of the axial location can now also be carried out here particularly simply by evaluating a vector sum $$\vec{u}(p_j, \vec{b}_j) = \frac{\sum_{j=1}^{m} p_j \cdot \vec{b}_j}{\sum_{j=1}^{m} p_j}$$

and application of a calibration function. In principle, a determination of the axial location of the excitable emitter could also be carried out by fitting an effective axial intensity profile 45 to the course of the measured intensity. In this case, however, there is on the one hand, among other things, the problem that the shape of the effective axial intensity profile depends on the radial distance to the central local minimum of the total effective intensity distribution 44 of the 3D excitation donut 8, and on the other hand, such a determination of the location is in principle more computationally expensive and thus more time-consuming.

The procedures for axial pre-localization 18 can also be used advantageously in conjunction with a subsequent MINFLUX localization in two dimensions. Here it has been shown that comparably good results can be achieved with a 3D excitation donut 8 as with a 2D excitation donut. This is important because it eliminates the need for a complex setup that allows rapid switching between different excitation intensity distributions. In addition, provided that the axial location of the emitter, in particular a fluorophore, is sufficiently well known, a 3D excitation donut generally has a larger lateral capture range for MINFLUX localization than a 2D excitation donut.

Figure 15:
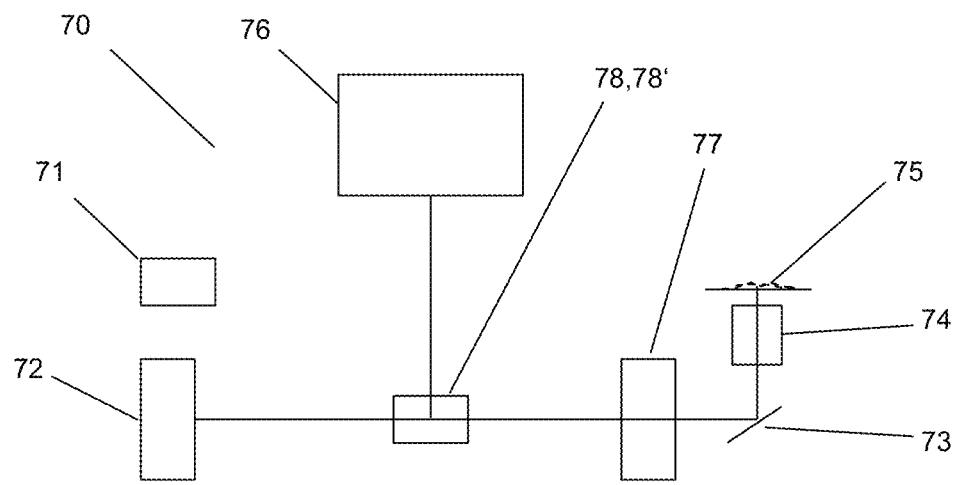
FIG. 15 is a schematic representation of an embodiment of a microscope according to the present disclosure.

In FIG. 15 an embodiment of a microscope 70 according to the present disclosure is shown schematically. The microscope 70 has an excitation light unit 76, which includes a light source and beam shaping elements, such that the excitation light forms a 3D excitation donut 8 in a sample 75. The beam shaping elements may be adjustable, such that it is possible for an excitation focus with a central maximum to be formed in the sample 75. Further, the excitation light unit 76 may comprise a deflection unit arranged to displace the 3D excitation donut 8 or more generally the excitation focus in particular laterally fast in the sample, that is, for example, to sequentially target lateral sample positions 31, 31', 31". The microscope 70 further comprises an element for coupling excitation light into a beam path common to excitation and detection, and for directing emission light emitted from the sample 75 toward a detection unit 72. Exemplarily, in the figure, the element is formed as a beam splitter 78, which in he case that fluorescence emission is to be detected, can be a dichroic beam splitter 78'. Further, the microscope 70 has a deformable mirror 73. This is placed here between a scanning unit 77 and an objective 74. It is placed and arranged in such a way that by deforming the deformable mirror 73, the excitation focus, in particular the 3D excitation donut, can be displaced in the axial direction in the sample 75. The scanning unit 77 may comprise, for example, a galvo scanner; it is configured to displace the excitation focus in lateral direction in the sample 75. The detection unit 72 may include a pinhole or, for example, an array of photon-counting avalanche diodes in a plane into which the excitation focus is imaged by means of the lens 74 and other optical elements not shown in the figure. Both the scan unit 77 and the deformable mirror 73 are positioned to act on the excitation light and the emission light, in particular fluorescent light to be detected. By means of the scanning unit 77, therefore, a point confocal to a fixed location in the sample 75 can be displaced in an image plane, for example in a circular path around a center. If the excitation light unit 76 has a deflection unit, then in cooperation of this deflection unit and the scanning unit 77 an excitation focus can be kept stationary in the sample 75, while by means of the scanning unit 77 the image of the location of the excitation focus in an image plane can be displaced relative to, for example, a pinhole. Further, the microscope 70 comprises a control unit 71 arranged to control the microscope 70 so as to perform a method according to the present disclosure. The control unit 71 can be connected to elements to be controlled via control lines (not shown) or also wirelessly, for example via radio.

LIST OF REFERENCE SIGNS 1 finding
2 Gaussian activation intensity distribution

3 Gaussian excitation intensity distribution
4 fluorophore
4' excitable emitter
5 first spatial direction
6 second spatial direction
7 axial spatial direction
8 3D excitation donut
9 Sampling pattern
10 prelocalization
11, 11' lateral location
12, 12' lateral location
13 pinhole orbit
15, 15' axial location
16 estimated location
17 lateral prelocalization
18 axial prelocalization
19 diameter
20, 20' 3D localization
21, 21' first position
22, 22' second position
23, 23' third position
24, 24' fourth position
25, 25' central position
26, 26' sixth position
27, 27' seventh position
28, 28' sampling pattern axis
29, 29' sampling pattern plane
30, 30', 30" lateral MINFLUX localization
31, 31', 31" lateral sample positions
32 2D excitation donut
33 iterative real-time MINFLUX localization
34 circle
40, 40', 40'" axial MINFLUX localization
43 final localization
44 effective intensity distribution
45 axial intensity profile
46 central local minimum
47 axial sample position
48 axial sample position
49 axial sample position
50 axial sample position
51 axial sample position
52 axial sample position
53 axial sample position
59, 59' axial sampling pattern
60 axial scanning range
61 axial capture range
62 lateral pre-localization area
63 prelocalization volume
64 displacement
70 microscope
71 control device
72 detection unit
73 deformable mirror
74 objective
75 sample
76 excitation light unit
77 scan unit
78 beam splitter
78' dichroic beam splitter

What is claimed is:

1. A method for high-resolution determination of the location of an excitable emitter in three spatial directions in a sample by scanning the excitable emitter with a 3D excitation donut having a central local minimum,
wherein in an axial localization step, the central local minimum is sequentially placed at two axial sample positions on a sampling pattern axis passing through an estimated location of the excitable emitter, the pair of sample positions enclosing the estimated location of the excitable emitter,
wherein in the axial localization step emission emitted from the excitable emitter for each of the axial sample positions is measured and the measured value is assigned to the respective axial sample position,
wherein in the axial localization step a new estimate of the axial location of the excitable emitter is determined from the measured values associated with the axial sample positions,
wherein
in a lateral localization step, the central local minimum is placed exclusively in a sampling pattern plane oriented perpendicular to the sampling pattern axis sequentially at at least three lateral sample positions arranged around a location of the excitable emitter estimated in one or more steps performed earlier,
wherein in the lateral localization step emission emitted from the excitable emitter for each of the lateral sample positions is measured and the measured value is assigned to the respective lateral sample position,
wherein in the lateral localization step a new estimate of the lateral location of the excitable emitter is determined from the measured values associated with the lateral sample positions.

2. The method of claim 1, wherein the steps of obtaining the estimated location of the excitable emitter comprise as one step a lateral pre-localization for estimating a lateral location of the excitable emitter performed before the axial localization step and the lateral localization step, wherein the excitable emitter is excited to emission with a 3D excitation donut, and wherein excited emission is detected.

3. The method of claim 2, wherein the lateral location of the excitable emitter is estimated from a spatially resolved detection of the emission in an image plane containing a point confocal to the excitation focus.

4. The method of claim 3, wherein the spatially resolved detection of the emission in the image plane is performed with an array of photon-counting avalanche diodes or by displacing the point confocal to the excitation focus in the image plane relative to a pinhole, particularly on a circular path around a center, wherein emission passing through the pinhole is detected with a detector and assigned to the respective position of the confocal point.

5. The method of claim 1, wherein the steps of obtaining the estimated location of the excitable emitter comprise, as a step of determining the axial coordinate of the estimated location, an axial pre-localization, which is performed prior to the axial localization step and the lateral localization step, wherein in the axial pre-localization an excitable emitter is scanned with focused excitation light in an axial scanning range which is greater than 500 nm or is greater than 1000 nm.

6. The method of claim 5, wherein the lateral localization step is performed for the first time after the axial pre-localization step and before the axial localization step is performed for the first time.

7. The method of claim 1, wherein a positioning of the 3D excitation donut at an axial position for sequential placing at the two axial sample positions and/or for setting the sampling pattern plane and/or wherein a positioning of the focused excitation light for sampling at the axial localization is carried out by guiding an excitation light via a deformable mirror through an objective into the sample, wherein the axial positioning is carried out by changing the shape of the deformable mirror.

8. The method of claim 5, wherein a positioning of the 3D excitation donut at an axial position for sequential placing at the two axial sample positions and/or for setting the sampling pattern plane and/or for scanning at the axial pre-localization and/or wherein a positioning of the focused excitation light for sampling at the axial localization is carried out by guiding an excitation light via a deformable mirror through an objective into the sample, wherein the axial positioning is carried out by changing the shape of the deformable mirror.

9. The method of claim 5, wherein in the axial pre-localization step the focused excitation light is a 3D excitation donut having an effective axial intensity profile with a central local minimum and maxima adjacent to the central local minimum.

10. The method of claim 9, wherein adjacent sampling points have at most half the distance of the maxima of the axial effective intensity profile, wherein sampling points adjacent to a central position of the axial region may have a larger distance to each other, which corresponds at most to the distance of the maxima of the axial effective intensity profile.

11. The method of claim 10, wherein the lateral localization step is performed for the first time after the axial pre-localization step and before the axial localization step is performed for the first time.

12. The method of claim 9, wherein the lateral localization step is performed for the first time after the axial pre-localization step and before the axial localization step is performed for the first time.

13. The method of claim 9, wherein the axial scanning range is greater than a distance between the maxima of the effective axial intensity profile.

14. The method of claim 13, wherein the axial scanning range is at least twice as large as the distance between the maxima of the effective axial intensity profile and wherein an axial capture range is at least as large as the distance between the maxima of the effective axial intensity profile.

15. The method of claim 14, wherein adjacent sampling points have at most half the distance of the maxima of the axial effective intensity profile, wherein sampling points adjacent to a central position of the axial region may have a larger distance to each other, which corresponds at most to the distance of the maxima of the axial effective intensity profile.

16. The method of claim 14, wherein the lateral localization step is performed for the first time after the axial pre-localization step and before the axial localization step is performed for the first time.

17. The method of claim 1, wherein several axial localization steps and/or several lateral localization steps are performed.

18. The method of claim 17, wherein after a lateral localization step, an axial localization step is next performed when a new estimate of the lateral location of the excitable emitter has been determined with a predetermined precision in the lateral localization step.

19. The method of claim 17, wherein several lateral localization steps are carried out in immediate succession, wherein a new estimated location of the excitable emitter is determined from the estimated location of the excitable emitter and the new estimate of the lateral location of the excitable emitter obtained in a lateral localization step, which new estimated location forms the estimated location of the excitable emitter for the respective following lateral localization step.

20. The method of claim 17, wherein an alternating sequence of axial localization steps and lateral localization steps is carried out, wherein in each case a new estimated location of the excitable emitter is determined from the estimated location of the excitable emitter and the new estimate of the axial location or the lateral location of the excitable emitter obtained in a step, which new estimated location forms the estimated location of the excitable emitter for the respective following step.

21. The method of claim 17, wherein a pair of the two sample positions surrounds the estimated location of the excitable emitter more densely in a later axial localization step than in an earlier axial localization step and/or that in a later lateral localization step the central local minimum is placed at lateral sample positions located more densely around the estimated location of the excitable emitter than in an earlier lateral localization step.

22. The method of claim 1, wherein the new estimate of the axial location of the excitable emitter and/or the new estimate of the lateral location of the excitable emitter is obtained by evaluating a vector sum and/or that the axial localization is performed by evaluating a vector sum.

23. The method of claim 22, wherein the vector sum is of the form $$\vec{u}(p_j, \vec{b}_j) = \frac{\sum_{j=1}^{m} p_j \cdot \vec{b}_j}{\sum_{j=1}^{m} p_j}$$

wherein the $p_j$ represent photon numbers or intensities which have been detected for positions $b_j$ of the 3D excitation donut, wherein the value of the vector sum is corrected according to a predetermined calibration function to obtain the new estimate of the axial location or the new estimate of the lateral location.

24. The method of claim 23, wherein the amount of background signal is taken into account when evaluating the vector sum, wherein the amount of background signal is slidingly determined from measurement data.

25. The method of claim 22, wherein the amount of background signal is taken into account when evaluating the vector sum, wherein the amount of background signal is slidingly determined from measurement data.

26. The method of claim 1, wherein it is performed in real time.

27. The method of claim 1, wherein the emitter is a fluorescent emitter, in particular an individual fluorescent dye molecule or a fluorescent chemical group of an individual fluorescent dye molecule, a quantum dot or an up-converting nanoparticle, and wherein the emission is fluorescence.

28. A microscope comprising control means adapted to control the microscope to perform a method according to claim 1.

29. The microscope of claim 28 comprising a deformable mirror for axially displacing an excitation focus in a sample.

* * * * *